US012227990B2

(12) United States Patent
Hitchon et al.

(10) Patent No.: US 12,227,990 B2
(45) Date of Patent: Feb. 18, 2025

(54) INTERLOCKING MOLDING WITH SIGHTLINE ELIMINATION FLANGE FOR TOILET AND OTHER PARTITIONS

(71) Applicant: American Specialties Inc., Yonkers, NY (US)

(72) Inventors: Douglas Hitchon, Eastanollee, GA (US); Donald Wayne Smith, Demorest, GA (US); Andrew Neil McCall, Hartwell, GA (US); Matthew Stepp, Pendleton, SC (US)

(73) Assignee: AMERICAN SPECIALTIES INC., Yonkers, NY (US)

( * ) Notice: Subject to any disclaimer, the term of this patent is extended or adjusted under 35 U.S.C. 154(b) by 0 days.

(21) Appl. No.: 17/848,894

(22) Filed: Jun. 24, 2022

(65) Prior Publication Data

US 2022/0412158 A1 Dec. 29, 2022

Related U.S. Application Data

(60) Provisional application No. 63/242,149, filed on Sep. 9, 2021, provisional application No. 63/214,974, filed on Jun. 25, 2021.

(51) Int. Cl.
*E06B 7/36* (2006.01)
*B21D 5/02* (2006.01)

(52) U.S. Cl.
CPC ................ *E06B 7/367* (2013.01); *B21D 5/02* (2013.01); *E06B 7/362* (2013.01)

(58) Field of Classification Search
CPC ............... E06B 7/367; E05Y 2900/112; E05D 2011/0072
See application file for complete search history.

(56) References Cited

U.S. PATENT DOCUMENTS 371,982 A 10/1887 Sessions
1,304,013 A 5/1919 Betz
(Continued)

FOREIGN PATENT DOCUMENTS

AT 383516 7/1987
CN 201280889 7/2009
(Continued)

OTHER PUBLICATIONS

International Search Report and Written Opinion, Application No. PCT/US2022/034907; Mailed Sep. 28, 2022 (12 pages).
(Continued)

*Primary Examiner* — Janet M Wilkens
*Assistant Examiner* — Susan M. Heschel
(74) *Attorney, Agent, or Firm* — Ware, Fressola, Maguire & Barber LLP

(57) ABSTRACT

A flanged interlocking molding is provided for use in toilet partitions or other partitions, and which eliminates the sight lines along each edge of the partition door. The flanged interlocking molding, formed of a single piece of material can be arranged on a component of the partition, such as a door and/or a pilaster. The flanged interlocking molding comprises a body portion; a first arm extending from a first edge of the body portion; a flange comprising include parallel layers of the metallic material including a first layer extending in a first direction away from the body portion, and a second layer extending from the first layer in a direction opposite the first direction; and a second arm extending from the second layer of the, the second arm including an edge arranged parallel to an edge of the first arm with a gap formed therebetween.

22 Claims, 37 Drawing Sheets

(56) References Cited

U.S. PATENT DOCUMENTS

| | | | | | |
|---|---|---|---|---|---|
| 1,343,545 | A | | 6/1920 | Betz | |
| 1,509,845 | A | | 9/1924 | Roby | |
| 2,087,721 | A | | 7/1937 | Kellog | |
| 2,240,482 | A | * | 5/1941 | Anderson | E04H 1/1266 52/270 |
| 2,776,029 | A | | 1/1957 | Hult | |
| 2,876,873 | A | * | 3/1959 | Benham | E05C 1/06 126/1 F |
| 3,004,636 | A | | 10/1961 | Shane | |
| 3,053,354 | A | | 9/1962 | Dielman | |
| 3,085,665 | A | | 4/1963 | Benham | |
| 3,104,428 | A | | 9/1963 | Benham | |
| 3,104,738 | A | | 9/1963 | Benham | |
| 3,177,532 | A | * | 4/1965 | Domsic | E05D 5/023 49/504 |
| 3,210,799 | A | | 10/1965 | Schooler | |
| 3,270,541 | A | | 9/1966 | Tishken | |
| 3,370,388 | A | | 2/1968 | Dielman | |
| 3,393,547 | A | | 7/1968 | Kortan | |
| 3,799,593 | A | | 3/1974 | Dielman | |
| 4,354,372 | A | | 10/1982 | Inoue et al. | |
| 4,478,019 | A | | 10/1984 | Thompson, Jr. | |
| 4,996,811 | A | * | 3/1991 | Dull | H02G 3/288 52/241 |
| 5,367,844 | A | | 11/1994 | Diedrich | |
| 5,630,302 | A | * | 5/1997 | Rosenband | E04H 1/1266 52/489.1 |
| 7,861,375 | B2 | | 1/2011 | Conway et al. | |
| 8,627,610 | B1 | * | 1/2014 | Crowther | E04H 1/1266 52/211 |
| 9,145,697 | B1 | | 9/2015 | Avery, III | |
| 9,198,549 | B1 | | 12/2015 | Ajello | |
| 9,487,948 | B1 | | 11/2016 | Bakker | |
| 9,879,461 | B2 | | 1/2018 | Conway | |
| 2010/0170315 | A1 | | 7/2010 | Meehan et al. | |
| 2012/0175065 | A1 | * | 7/2012 | Mayzum | E06B 7/16 160/24 |
| 2014/0283469 | A1 | | 9/2014 | Babikian | |
| 2018/0266175 | A1 | * | 9/2018 | York | E05D 7/009 |
| 2019/0071922 | A1 | | 3/2019 | Peterson | |

FOREIGN PATENT DOCUMENTS

| | | | |
|---|---|---|---|
| CN | 201857877 | U | 6/2011 |
| CN | 204059667 | U | 12/2014 |
| CN | 104264868 | A | 1/2015 |
| CN | 204401825 | U | 6/2015 |
| CN | 109854122 | A | 6/2019 |
| CN | 212201790 | U | 12/2020 |
| CN | 112282433 | A | 1/2021 |
| CN | 112709520 | A | 4/2021 |
| CN | 212984756 | U | 4/2021 |
| CN | 213773983 | U | 7/2021 |
| CN | 214117957 | U | 9/2021 |
| DE | 202014102262 | U1 | 6/2014 |
| JP | 2005351022 | A | 12/2005 |
| KR | 200426030 | Y1 | 9/2006 |
| KR | 20100130024 | A | 12/2010 |
| KR | 101310429 | B1 | 9/2013 |
| KR | 101666858 | B1 | 10/2016 |
| KR | 20200011131 | A | 2/2020 |

OTHER PUBLICATIONS

International Search Report and Written Opinion, Application No. PCT/US2022/034922; Mailed Sep. 27, 2022 (8 pages).

Office Action, U.S. Appl. No. 17/848,999, mailed Mar. 30, 2023.

* cited by examiner 40b
22
30

30
21
40a
20
D
D
40a
40b 30
31a
31b

SECTION B-B

SECTION C-C

SECTION A-A

SECTION B-B

SECTION C-C

SECTION A-A

SECTION A-A
SCALE 2 : 1

INTERLOCKING MOLDING WITH SIGHTLINE ELIMINATION FLANGE FOR TOILET AND OTHER PARTITIONS

CROSS-REFERENCE TO RELATED APPLICATIONS

The present application claims the benefit of U.S. Provisional Patent Application No. 63/214,974 filed Jun. 25, 2021 and U.S. Provisional Patent Application No. 63/242,149 filed Sep. 9, 2021, which are each hereby incorporated by reference in their entireties.

FIELD OF THE APPLICATION

The present application relates to toilet partitions, and more particularly, relates to a process for creating a flanged interlocking molding having a sightline elimination flange for use in toilet partitions to eliminate sight lines.

BACKGROUND OF THE DISCLOSURE

Standard partitions for use in public restrooms include several components, as shown for example in FIGS. 1A-1C. A typical partition 20 includes a door 30 arranged between two pilasters 40*a*, 40*b*, each of which is also secured to a panel wall and/or adjacent partition (not shown). The door 30 and the pilasters 40*a*, 40*b* combine to provide privacy to the user of the restroom.

The door 30 of the partition 20 generally comprises multiple components and is connected to a pilaster 40*a* on one side by one or more hinges 31*a*, 31*b* and includes a locking element 32 on the opposite side that engages a corresponding locking element 42 on the pilaster 40*b* to secure the door 30 in a closed position. An example of a typical door 30 for a restroom partition 20 can be observed in FIGS. 1A-2C. Such doors 30 commonly include two skins 33, 34 (such as sheets of metal or plastic) with a membrane or core 35, arranged in between the skins 33, 34. An interlocking molding 25, also known as a lock strip, is typically provided on each edge to lock the two skins 33, 34 together and secure the door skins 33, 34 and core 35 to each other, and an example of a standard interlocking molding 25 or interlocking molding known in the art is shown in FIGS. 3A-3D. The edges of skins 33, 34 form opposing hook-like elements having slots 37*a*, 37*b* formed therein. Arms on the interlocking molding 25 are configured to be arranged into the slots 37*a*, 37*b* to attach the two skins 33, 34 to one another.

An example of a typical pilaster 40*a*, 40*b* for a restroom partition 20 can also be observed in FIGS. 1A-2C. Such pilasters 40*a*, 40*b* also commonly include two skins 43*a*, 43*b*, 44*a*, 44*b* with a core 45*a*, 45*b*, arranged therebetween. An interlocking molding 25 is provided on each edge to lock the skins 43*a*, 43*b*, 44*a*, 44*b* together, by engaging the slots 47*a*, 47*b* on each edge of the pilaster 40*a*, 40*b* adjacent to the door 30. A shoe 48*a*, 48*b* may also be provided around the pilaster 40*a*, 40*b* at its base.

The standard design of toilet partitions 20 as shown in FIGS. 1A-3D has shortcomings with respect to the provision of privacy to the user. As shown for example in FIGS. 1B and 1C, gaps 21, 22 are created in between the door 30 and the adjacent pilaster 40*a*, 40*b* along the entire height of the door 30. These gaps 21, 22 between the door 30 and pilasters 40*a*, 40*b* reduce the privacy of the user, as sight lines into the partition 20 from outside the partition 20 are provided through these gaps 21, 22.

There are designs currently available that may enable the removal or reduction of these sight lines, but only after the toilet partitions (as shown in FIG. 1A) have been installed or assembled. These designs require that an additional after-market piece be adhered to or fastened on to the toilet partition door or pilaster after the door and pilaster have been manufactured and/or installed. This aftermarket piece only serves as a blocking function and does not function as a lock strip, or interlocking molding, or perform any other function integral to the toilet partition. Such solutions are more costly to the end customer, as they require the purchasing of the additional component to be installed and require additional time and labor on the part of the installer to incorporate this aftermarket piece onto the partitions.

SUMMARY OF THE DISCLOSURE

The present application addresses these shortcomings in the art by providing a flanged interlocking molding that can be built into the initial design of the toilet partition components, and which eliminates the sight lines along each edge of the partition door. The flanged interlocking molding, formed of a single piece of material, includes an interlocking molding with a contiguous flange along its length. The flanged interlocking molding is arranged on a component of the partition, such as the door and/or a pilaster, on one, or both edges of the door and/or pilaster. The flanged interlocking molding serves the function of lock strip, holding the two metal sheets together as well as providing a flange covering the gap between the door and the pilaster to block the sight lines.

The flanged interlocking molding can be made a critical part of the toilet partition components (e.g., a pilaster or door) in such a way that the manufactured component would not be considered complete if shipped without the flanged interlocking molding, which contrasts with all other designs that require an additional component. The flanged interlocking molding combines the function of an interlocking molding with a secondary product that eliminates the line of sight between toilet partition components.

In accordance with various aspects of the present application, various products can be provided, including: a flanged interlocking molding that can be used in a partition (including but not limited to a toilet partition) to close a gap in between a door and a pilaster or between two other panel-like structures; a door for a toilet partition comprising a flanged interlocking molding on either or both edges of the door that is configured to close a gap that is creating a sightline in between the door and a pilaster; a pilaster for a toilet partition comprising a flanged interlocking molding on at least one edge that is configured to close a gap that is creating a sightline in between a door and the pilaster; a panel for a partition (including a toilet partition) comprising a flanged interlocking molding on at least one edge that is configured to close a gap that creates a sightline in between a panel and the pilaster arranged perpendicularly to the panel; and a toilet partition comprising a door, two pilasters, and at least two flanged interlocking moldings, one in between the door and each pilaster, which are secured to either or both of the door or a pilaster, and are configured to close the gaps that are creating a sightline in between a door and the pilasters. The toilet partition may further comprise two panel walls perpendicular to the pilaster, each of the panel walls also comprising a flanged molding along an edge of the panel wall adjacent to a pilaster.

A process for manufacturing the flanged interlocking molding according to the present application includes a custom machine capable of utilizing dies/rolls to form a profiled piece. A flat piece of steel is fed through a series of custom dies/rolls that establishes a continuous bending process that achieves the desired profile.

In accordance with a first aspect of the present application, an apparatus is provided. The apparatus comprises a body portion; a first arm opposing an inner surface of the body portion and extending from a first edge of the body portion; a flange comprising parallel layers of the metallic material, the parallel layers comprising: a first layer extending in a first direction away from the body portion at a second edge of the body portion opposite the first edge of the body portion, and a second layer extending at a first edge from the first layer in a second direction opposite the first direction; and a second arm extending from a second edge of the second layer of the flange and opposing the inner surface of the body portion, the second arm including an edge arranged parallel to an edge of the first arm with a gap formed therebetween.

Implementations of the apparatus of the first aspect of the present application may include one or more of the following features. The body portion of the apparatus may include an outer surface having a convexly curved cross-sectional profile. The flange includes a first end and a second end, and at least one of the first end or the second end may be curved, beveled, or straight including a substantially right angle. The first arm includes a first end and a second end, and at least one of the first end or the second end may be beveled. The second arm also includes a first end and a second end, and at least one of the first end or the second end may be beveled. The metallic material can be stainless steel, aluminum, or galvanneal. The first arm and the second arm may collectively form a locking mechanism configured to engage locking elements on a structure to secure the apparatus to the structure. The length of the body portion can be greater than the length of each of the flange, the first arm, and the second arm. The apparatus may also comprise a uniform cross-sectional profile along the entire length of the apparatus. The flange may be formed at a non-perpendicular angle relative to a reference plane through a base of the first arm and a base of the second arm.

In accordance with a second aspect of the present application, a system is provided. The system comprises a door having a hinge side and a locking side; a first pilaster arranged adjacent to the hinge side of the door; and a second pilaster arranged adjacent to the locking side of the door. The system further comprises a first apparatus secured to the hinge side of the door or the first pilaster, and a second apparatus secured to the locking side of the door or the second pilaster. Each of the first and second apparatuses are formed of an elongated and contiguous strip of a metallic material, and comprise: a body portion; a first arm opposing an inner surface of the body portion and extending from a first edge of the body portion; a flange comprising parallel layers of the metallic material, the parallel layers including: a first layer extending in a first direction away from the body portion at a second edge of the body portion opposite the first edge of the body portion, and a second layer extending at a first edge from the first layer in a second direction opposite the first direction; and a second arm extending from a second edge of the second layer of the flange and opposing the inner surface of the body portion, the second arm may include an edge arranged parallel to an edge of the first arm with a gap formed therebetween. In the system, the first apparatus is provided along the height of the hinge side of the door and the flange of the first apparatus is configured to conceal a gap formed between the door and the first pilaster to prevent a sightline forming between the first pilaster and the door; and the second apparatus is provided along the height of the locking side of the door and the flange of the second apparatus is configured to conceal a gap formed between the door and the second pilaster to prevent a sightline forming between the second pilaster and the door.

In implementations of the system of the second aspect of the present application, the first apparatus is secured to the first pilaster and the second apparatus is secured to the second pilaster. The first pilaster may include a pair of lengthwise slots configured to be engaged by the first arm and the second arm of the first apparatus to secure the first apparatus to the first pilaster. The first pilaster may further include: an inner core; a first skin covering a first side of the inner core; and a second skin covering a second and opposite side of the inner core. Each of the first skin and the second skin may include a lengthwise hook element, each defining one of the lengthwise slots therein, and the first apparatus is configured to clamp the first skin to the second skin of the first pilaster.

In implementations of the system of the second aspect of the present application, the first apparatus is secured to the hinge side of the door and the second apparatus is secured to the locking side of the door. The hinge side of the door and the locking side of the door each may include a pair of lengthwise slots configured to be respectively engaged by the first arm and the second arm of the first apparatus to secure the first apparatus to the hinge side of the door and by the first arm and the second arm of the second apparatus to secure the second apparatus to the locking side of the door. The door may include: an inner core; a first skin covering a first side of the inner core; and a second skin covering a second and opposite side of the inner core. Each of the first skin and the second skin may include a lengthwise hook element on each of the hinge side of the door and the locking side of the door, each defining one of the lengthwise slots therein; and the first apparatus and the second apparatus are configured to clamp the first skin to the second skin of the door. The door is configured for rotation of at least ninety degrees about the hinge side from a first, closed position to a second, opened position.

In accordance with a third aspect of the present application, a further system is provided, comprising an apparatus, formed of an elongated and contiguous strip of a metallic material. The apparatus comprises: a body portion; a first arm opposing an inner surface of the body portion and extending from a first edge of the body portion; a flange comprising parallel layers of the metallic material, the parallel layers including a first layer extending in a first direction away from the body portion at a second edge of the body portion opposite the first edge of the body portion, and a second layer extending at a first edge from the first layer in a second direction opposite the first direction; and a second arm extending from a second edge of the second layer of the flange and opposing the inner surface of the body portion, the second arm including an edge arranged parallel to an edge of the first arm with a gap formed therebetween; and a panel structure to which the apparatus is secured.

Implementations of the system of the third aspect of the present application may include one or more of the following features. The panel structure of the system may be a door, and the apparatus is secured to the door on one vertical edge of the door along the height of the door. The panel structure of the system may also be a pilaster, and the apparatus is secured to the pilaster on one vertical edge of the pilaster along the height of the pilaster. The panel structure of the system may also be a partition wall, and the apparatus is secured to the partition wall on one vertical edge of the partition wall along the height of the partition wall.

In accordance with a fourth aspect of the present application, a method for manufacturing an apparatus is provided. The method comprises providing an elongated strip of a metallic material having an initial, substantially flat profile to a device including a roll former that includes a plurality of dies in series, each of the plurality of dies being configured to modify a profile of the elongated strip. The method further comprises modifying the profile of the elongated strip from the substantially flat profile to a profile that includes a plurality of profile segments separated by bends in the metallic material. The modifying occurs by passing the elongated strip through the plurality of dies sequentially to define the profile, and the profile segments include: a first segment corresponding to a first arm of the apparatus; a second segment, adjacent to the first segment, and corresponding to a body portion of the apparatus; a third segment, adjacent to the second segment, and corresponding to a first flange layer of a flange of the apparatus; a fourth segment, adjacent to the third segment, and corresponding to a second flange layer of the flange of the apparatus; and a fifth segment, adjacent to the fourth segment, and corresponding to a second arm of the apparatus.

In accordance with an implementation of the method of the fourth aspect of the application, the manufactured apparatus may include: the body portion; the first arm opposing an inner surface of the body portion and extending from a first edge of the body portion; the flange including the first flange layer extending in a first direction away from the body portion at a second edge of the body portion opposite the first edge of the body portion, and the second flange layer extending at a first edge from the first flange layer in a second direction opposite the first direction; and the second arm extending from a second edge of the second flange layer and opposing the inner surface of the body portion. The second arm includes an edge arranged parallel to an edge of the first arm with a gap formed therebetween. The apparatus may be a flanged interlocking molding configured for eliminating a sightline between two structures, such as a door and a pilaster in a restroom partition.

In accordance with various implementations of the method, modifying the profile of the elongated strip may include a first shaping step, performed by a first set of dies that include one or more the plurality of dies, the first shaping step configured to define a length of the first arm and of the second arm of the apparatus by defining a length of the first segment and of the fifth segment of the elongated strip, respectively. The first set of dies performing the first shaping step is arranged at a start of the series of the plurality of dies. Modifying the profile of the elongated strip further may include a second shaping step, performed by a second set of dies that includes one or more of the plurality of dies, the second shaping step configured to define a length of the first flange layer and a length of the second flange layer of the apparatus by defining a length of the third segment and a length of the fourth segment of the elongated strip, respectively. The second shaping step is further configured to define an angular alignment of the flange of the apparatus to the body portion of the apparatus by defining an angular alignment between the second segment and the third segment of the elongated strip. The second shaping step at least partially overlaps with the first shaping step and the second set of dies at least partially overlaps with the first set of dies, sharing one or more dies. Modifying the profile of the elongated strip still further may include a third shaping step, performed by a third set of dies that includes one or more of the plurality of dies, the third shaping step configured to define a radius at a peak of the flange by defining an angle between of the third segment and the fourth segment of the elongated strip, respectively. The third set of dies performing the third shaping step includes a die arranged at an end of the series of the plurality of dies. The second shaping step may further at least partially overlap with the third shaping step and the second set of dies may further at least partially overlap with the third set of dies, sharing one or more dies.

In additional or alternative implementations of the method of the fourth aspect of the application, the method may include forming the second segment into a convexly curved profile. The method may comprise, prior to modifying the profile of the elongated strip, punching the elongated strip with a double miter die, when the body portion of the manufactured apparatus includes curved ends. The method may comprise, prior to modifying the profile of the elongated strip, punching the elongated strip with a double straight die, when the body portion of the manufactured apparatus includes straight ends. The method may comprise, after modifying the profile of the elongated strip, cutting one or more ends of the third segment and fourth segment to provide the first flange layer and the second flange layer with one or more curved ends. The method may comprise, after modifying the profile of the elongated strip, cutting one or more ends of the third segment and fourth segment to provide the first flange layer and the second flange layer with one or more beveled ends. The method may comprise, prior to modifying the profile of the elongated strip, cutting one or more ends of the first segment and/or the fifth segment to provide the first arm and/or the second arm with one or more curved or beveled ends. In implementations of the method of the present application, the metallic material is stainless steel, aluminum, or galvanneal.

DETAILED DESCRIPTION OF THE INVENTION

The flanged interlocking molding of the present application and method of manufacturing the same will be described with reference to FIGS. 4A-13D.

Figures 1A, 1B, 1C:
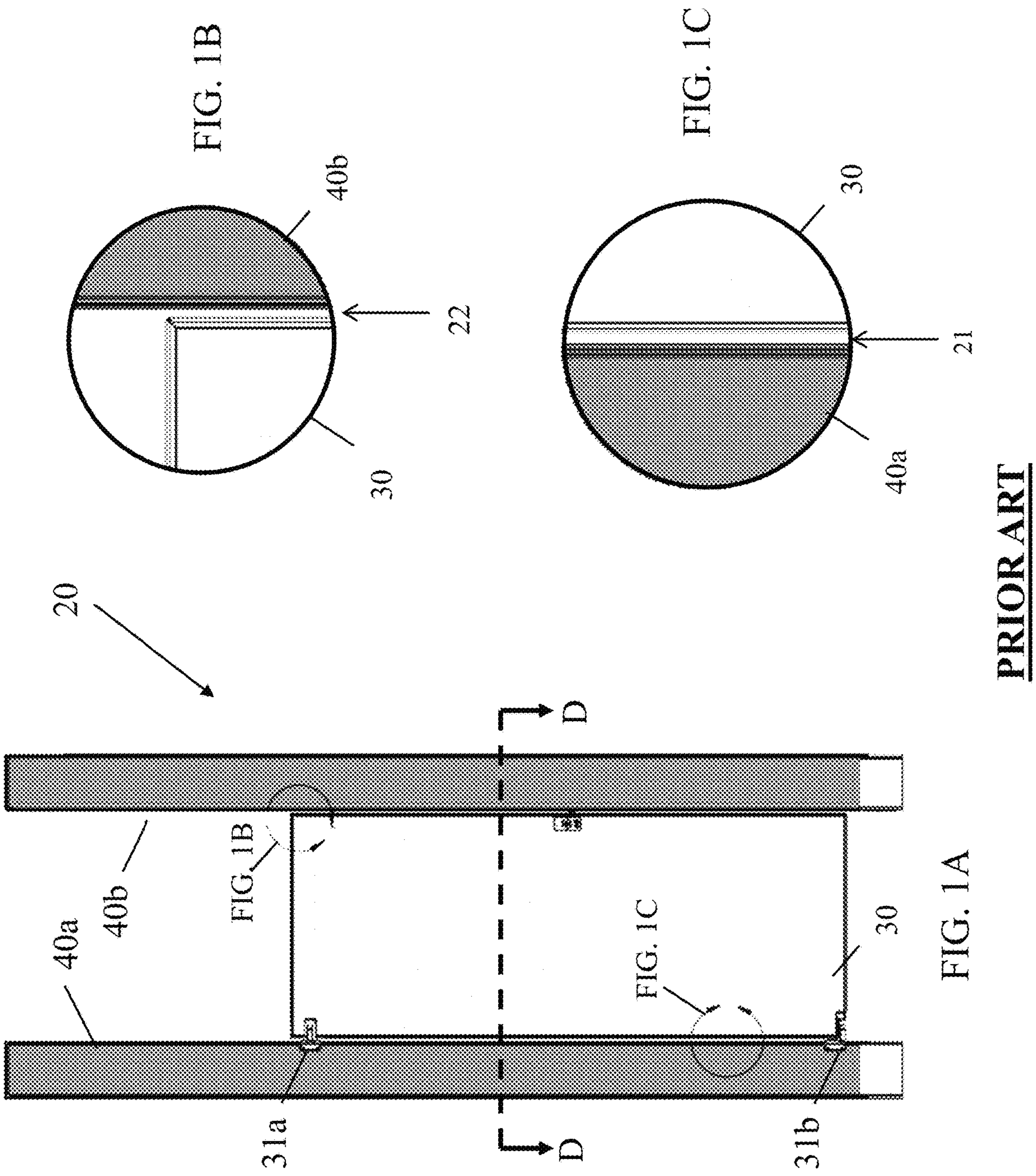
FIG. 1A PRIOR ART
FIGS. 1A-1C show various views of a toilet partition according to the prior art.
Figures 2A, 2B, 2C:
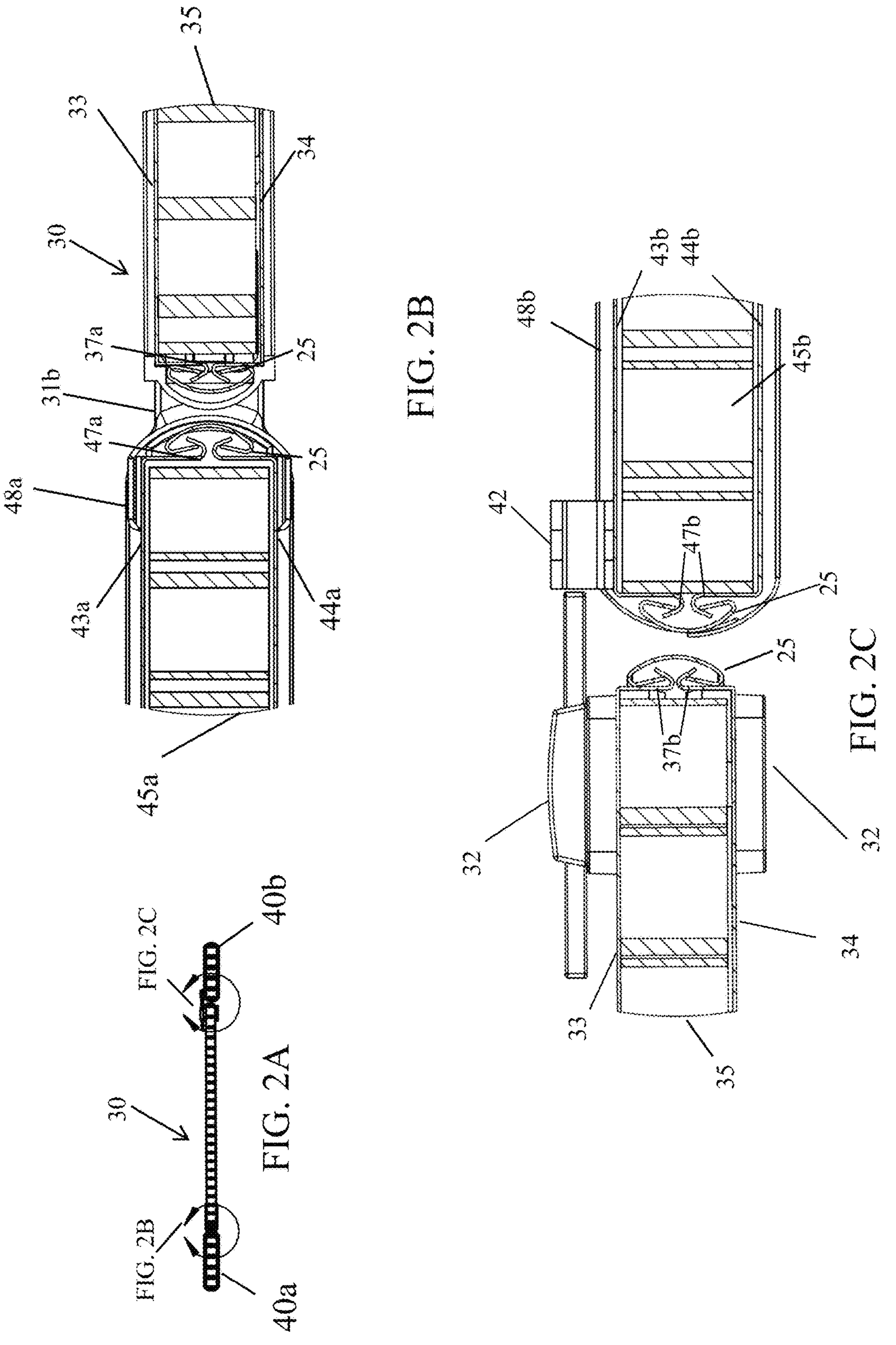
FIG. 2C PRIOR ART
FIGS. 2A-2C show cross-sectional views of a door of a toilet partition according to the prior art.
Figure 3B:
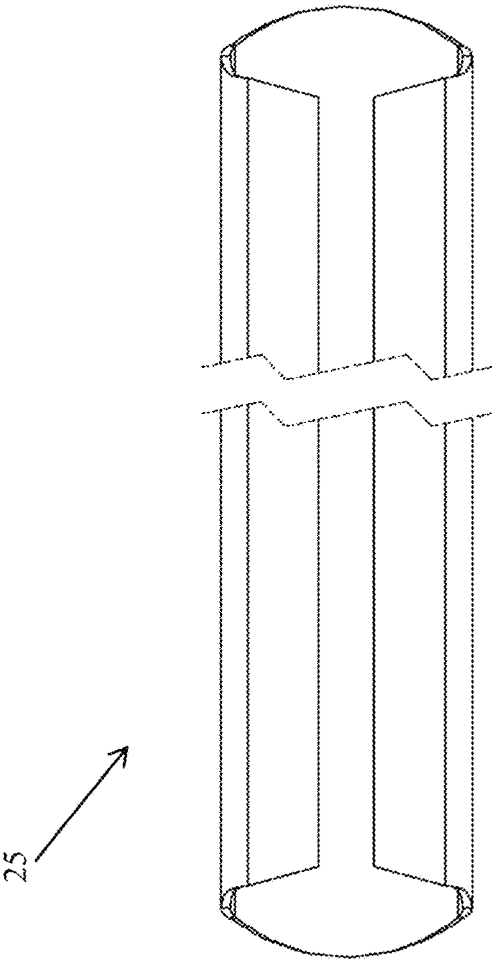
FIGS. 3A-3D show various views of an interlocking molding of a toilet partition according to the prior art.
Figure 3C:
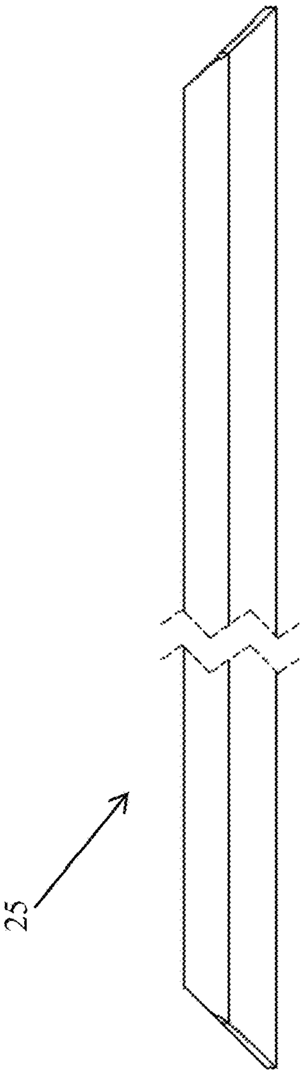
FIG. 3C PRIOR ART
Figure 3A:
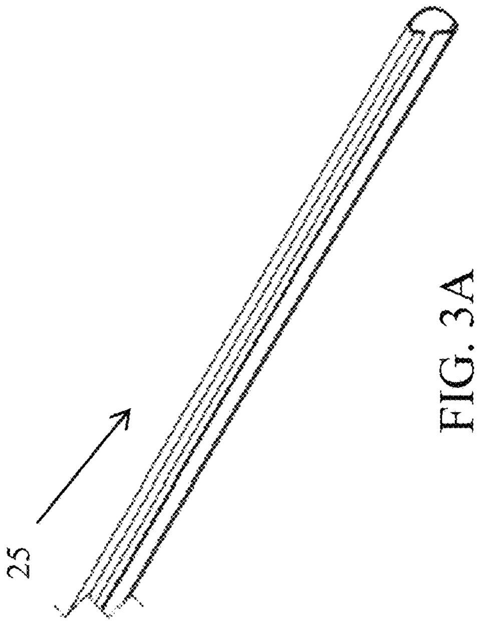
Figure 3D:
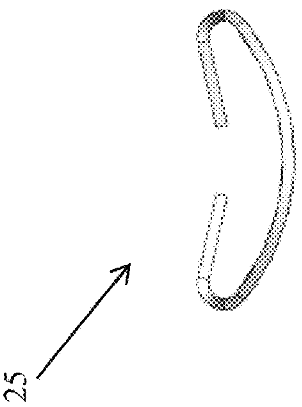
Figure 4A:
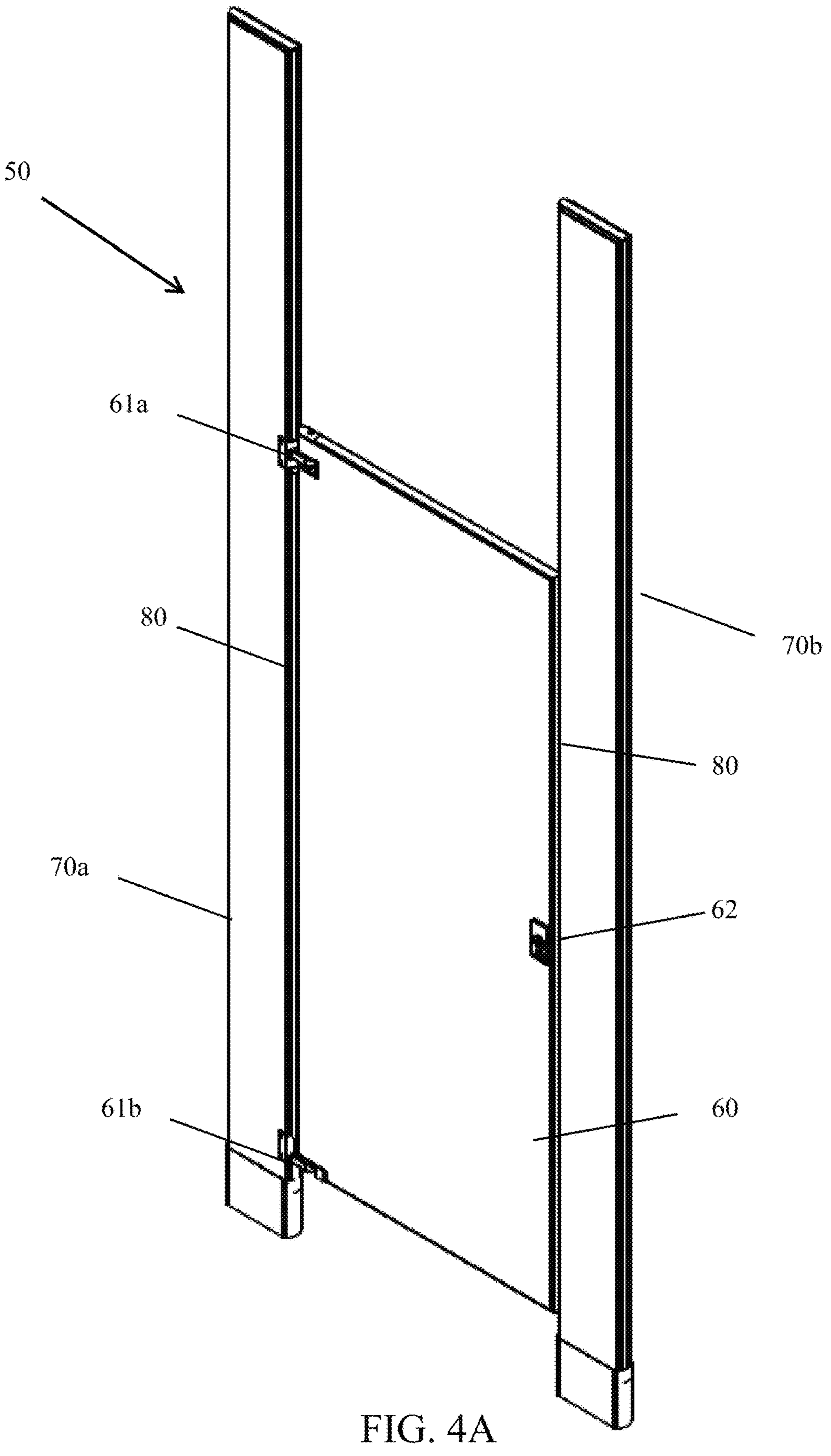
FIG. 4A shows a front perspective view of a toilet partition including a flanged interlocking molding in accordance with an embodiment of the present application.
Figure 4B:
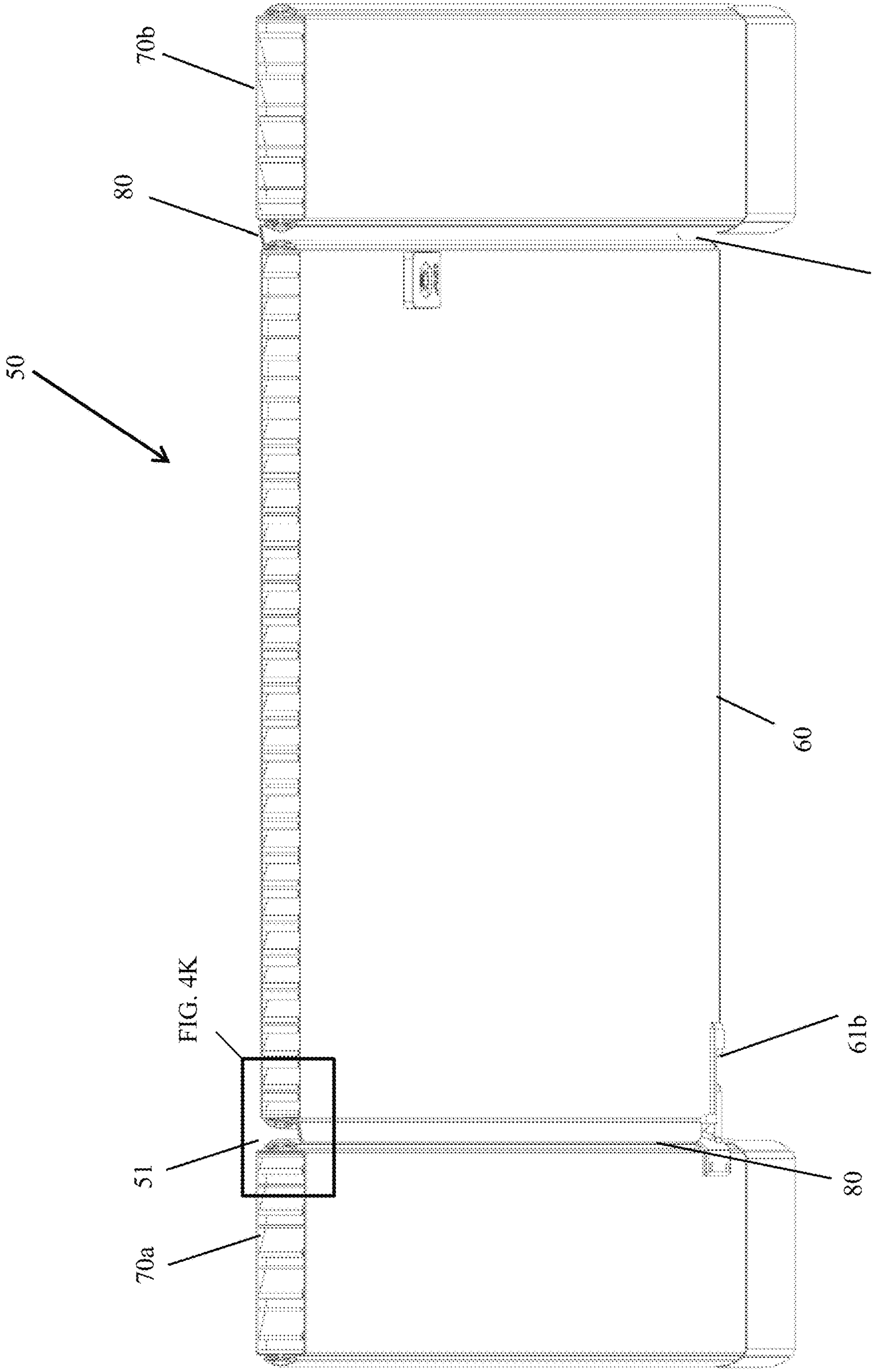
FIG. 4B shows a cross-sectional perspective view of a toilet partition including a flanged interlocking molding in accordance with an embodiment of the present application.
Figure 4D:
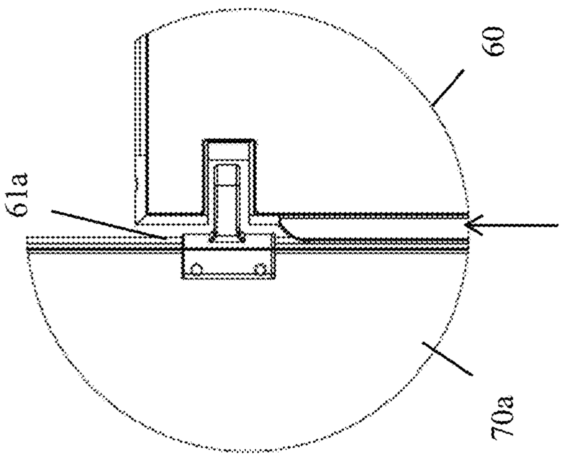
FIGS. 4D-4G show various close-up views of sections of the toilet partition including a flanged interlocking molding identified in FIG. 4C.
Figure 4E:
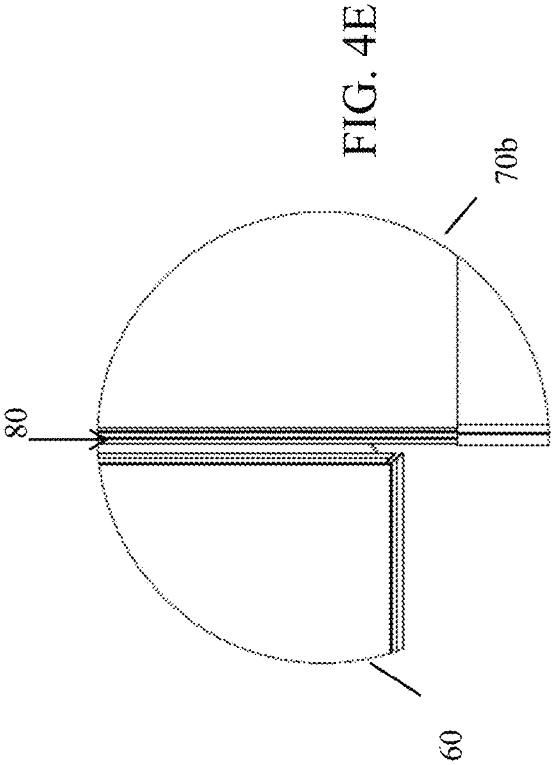
Figure 4C:
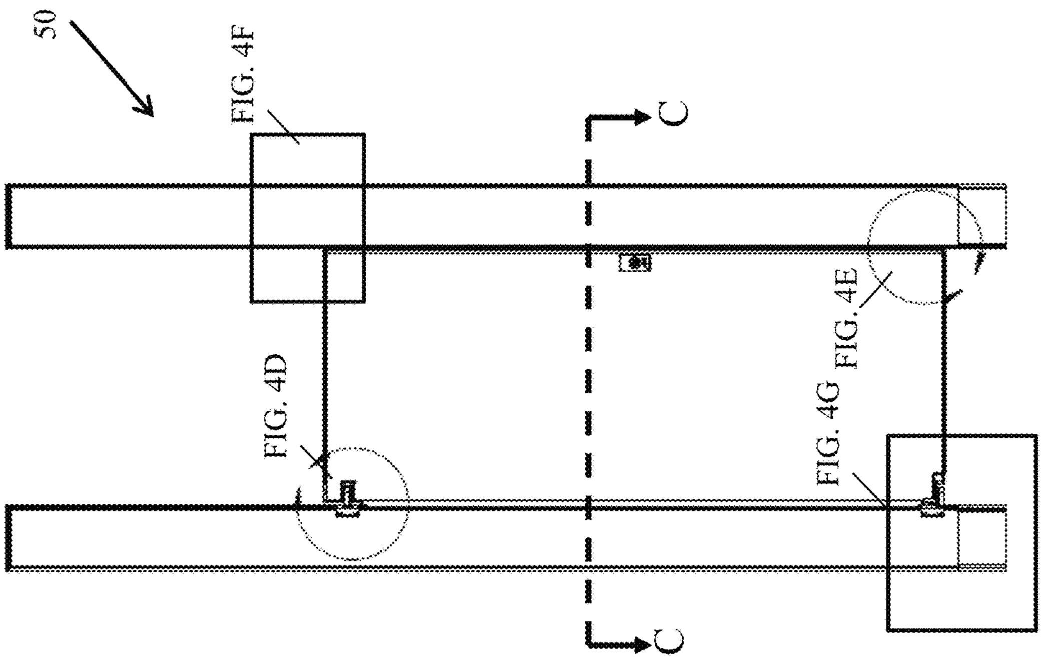
FIG. 4C shows a front view of a toilet partition including a flanged interlocking molding in accordance with an embodiment of the present application.
Figure 4F:
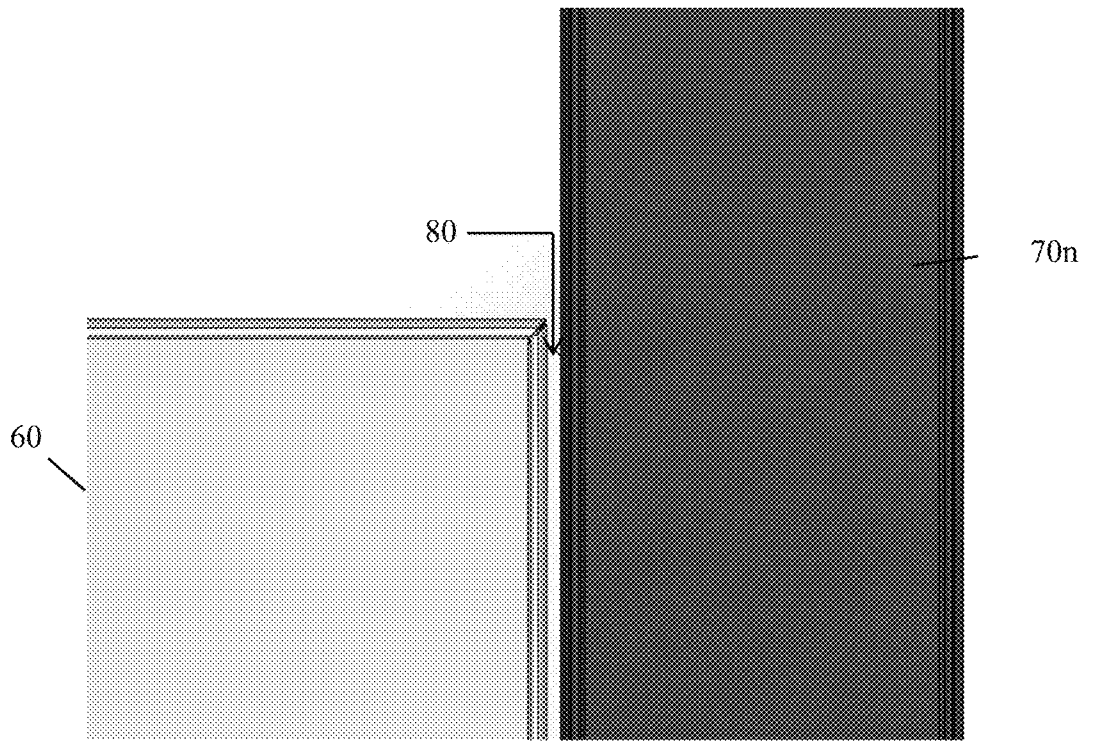
Figure 4G:
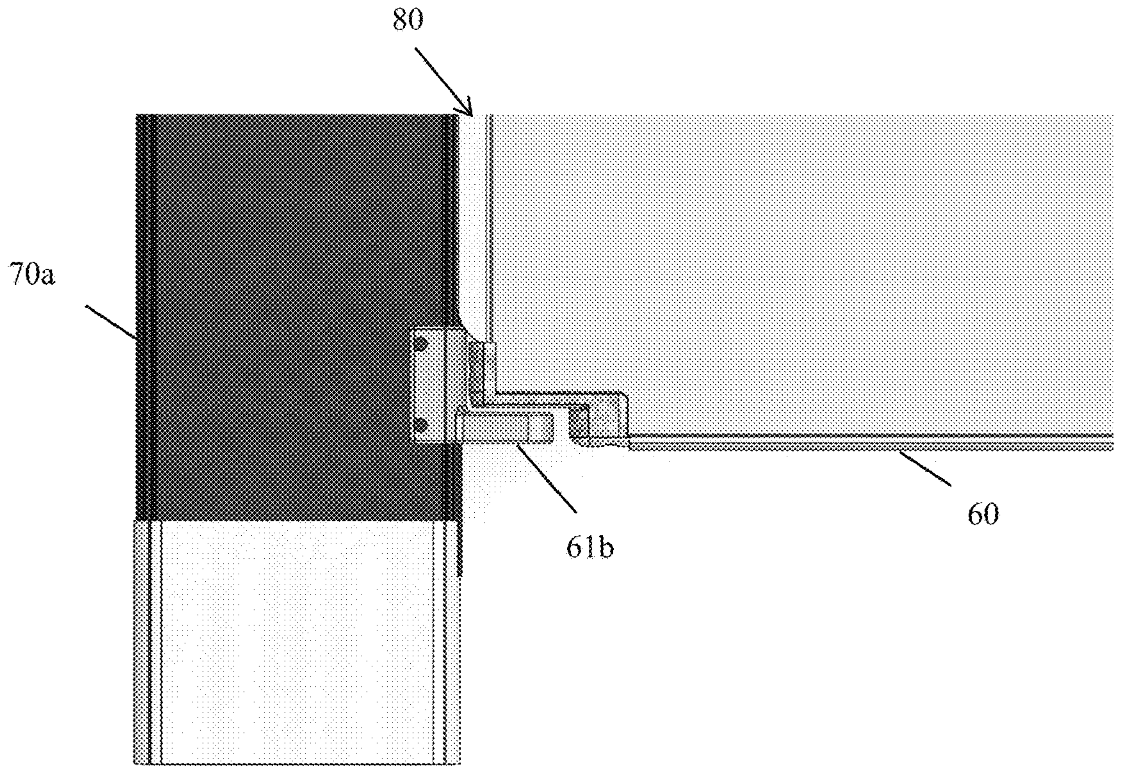

FIGS. 4A-4B illustrate a toilet partition 50 comprising the flanged interlocking molding 80 of the present application. The toilet partition 50 can include several standard components of a toilet partition, such as a door 60 and pilasters 70*a*, 70*b*, but further includes two flanged interlocking moldings 80, one on each vertical edge of the door 60, which as shown in FIG. 4B, block the gaps 51, 52 along each edge of the door 60 so that there are no sight lines along the door 60 into the partition 50. Additional views of the flanged interlocking molding 80 arranged between the door 60 and pilasters 70*a*, 70*b* are shown in FIGS. 4C-4G. While the Figures may illustrate the flanged interlocking molding 80 used in combination with certain doors 60, pilasters 70*a*, 70*b*, and hinges 61*a*, 61*b*, it is noted that the flanged interlocking molding 80 is not limited to use with any particular type or structure of door, pilaster, or panel and the flanged interlocking molding 80 can be used in toilet partitions in which any type of door hinge or lock is used. The length of the flanged interlocking molding 80 can vary depending on the required length of the gap 51, 52 between the door 60 and pilaster 70*a*, 70*b* to be closed, and if necessary, multiple flanged interlocking moldings 80 can be used on one edge of a door 60 or pilaster 70*a*, 70*b*, such as above and/or below a hinge 61*a*, 61*b*. The ends of the flanged interlocking molding 80, shown for example in FIGS. 4D-4G, may be designed as beveled, square (i.e., flattened) 88*a*, 88*b* (shown for example in FIG. 6H), or rounded 84*a*, 84*b* (shown for example in FIGS. 6B-6C).

Figure 4I:
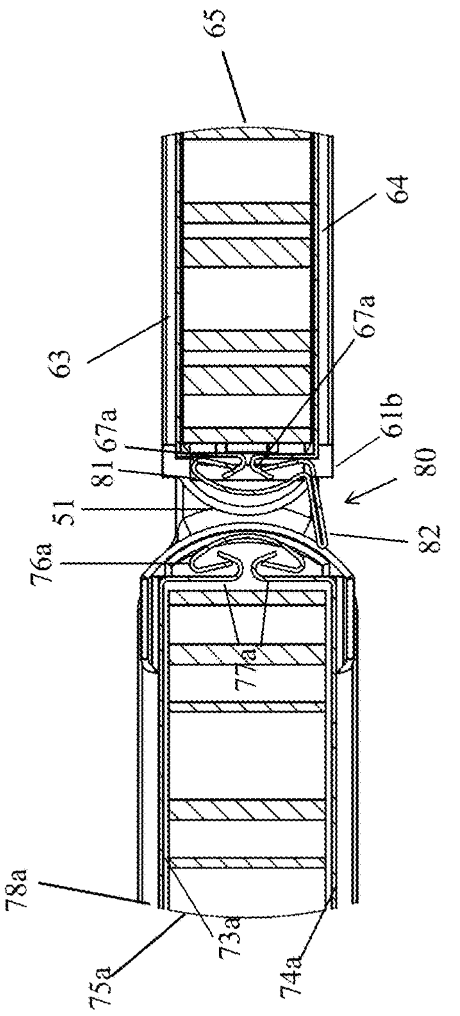
FIGS. 4H-4J show various cross-sectional views of the toilet partition including a flanged interlocking molding according to an embodiment of the present application.
Figure 4H:
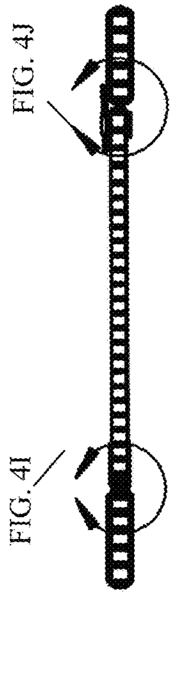
Figure 4J:
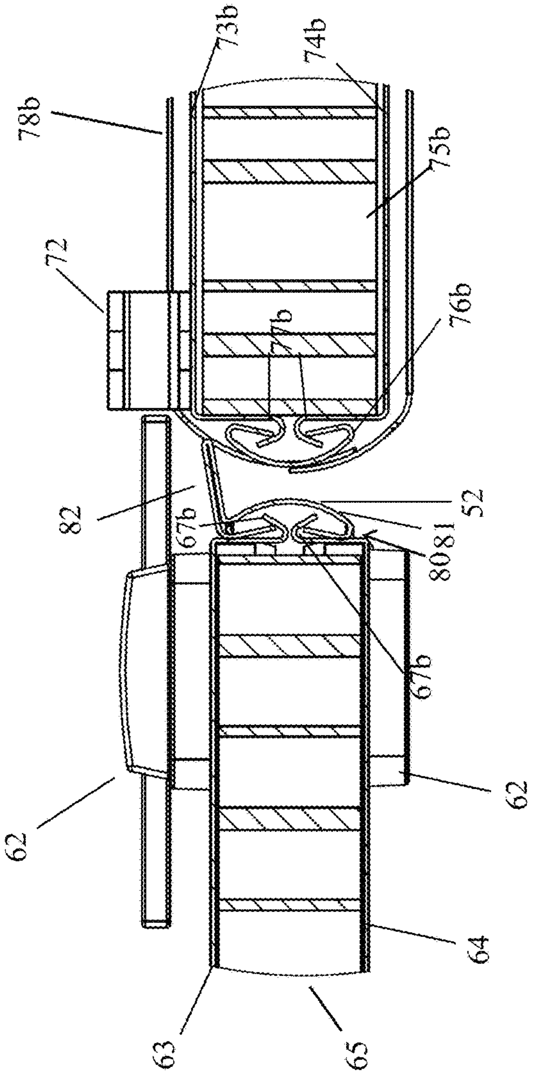
Figure 4K:
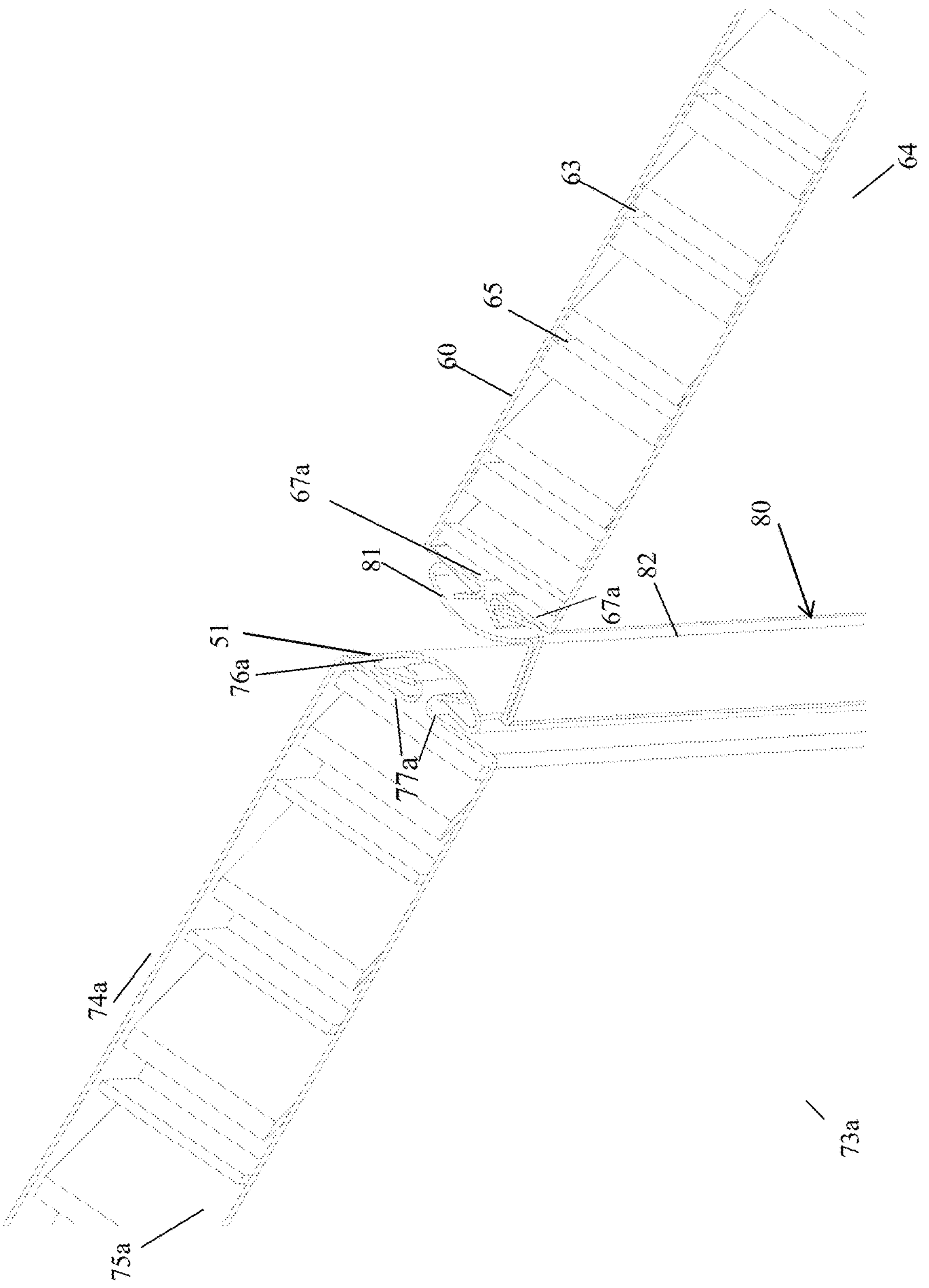
FIG. 4K shows a close-up, partial top view of the toilet partition including a flanged interlocking molding identified in FIG. 4B.

The manner in which the flanged interlocking molding 80 is secured to the toilet partition 50 can be seen for example in FIGS. 4I-4K. FIGS. 4I and 4K show the flanged interlocking molding 80 secured to the door 60 of the partition 50 on the hinge side of the door 60. The flanged interlocking molding 80 includes an interlocking molding 81 and a contiguous flange 82 extending away from the interlocking molding 81. The door 60 includes a front skin 63 and a rear skin 64, each skin 63, 64 being formed from a sheet of metal material, with a core 65 or membrane arranged in between the two skins 63, 64. The core 65 may be made of cardboard or other suitable material, and an adhesive can be provided between each skin 63, 64 and a respective side of the core 65 facing the skin 63, 64. Each skin 63, 64 includes lengthwise extensions on each lateral edge, which are hook-shaped in the cross-section so as to form slots 67*a*, 67*b*. The flanged interlocking molding 80 includes an interlocking molding 81 having two adjacent and opposing lengthwise wings or arms 85*a*, 85*b*. The interlocking molding arms 85*a*, 85*b* are configured to slide into the slots 67*a*, 67*b* of the door skin 63, 64, and function to clamp together the two skins 63, 64 of the door 60 and lock the door 60 components in place. When the interlocking molding 81 of the flanged interlocking molding 80 is in place and secured to the door 60, the flange 82 is positioned in between the door 60 and the pilaster 70*a*, 70*b* of the partition 50. The flange 82 may be planar with the door 60 or pilaster 70*a*, 70*b* or arranged at an acute angle relative to the door 60, such as a 10°±.

Similar to the door 60, the pilasters 70*a*, 70*b* may also similarly include a front skin 73*a*, 73*b* and a rear skin 74*a*, 74*b*, each skin 73*a*, 73*b*, 74*a*, 74*b* being formed from a sheet of metal material, with a core 75*a*, 75*b* or membrane arranged in between the two skins 73*a*, 73*b*, 74*a*, 74*b* and adhesive to adhere the cores 75*a*, 75*b* to the skins 73*a*, 73*b*, 74*a*, 74*b*. Similar to the construction of door 60, each pilaster skin 73*a*, 73*b*, 74*a*, 74*b* includes lengthwise extensions on each lateral edge, which are hook-shaped in the cross-section so as to form slots 77*a*, 77*b*. In constructions such as those shown in the FIGS. 4I-4K, where the door 60 has a flanged interlocking molding 80 on each edge, the pilasters 70*a*, 70*b* may each comprise a standard interlocking molding 76*a*, 76*b* engaged with the slots 77*a*, 77*b*.

FIG. 4J shows the flanged interlocking molding 80 secured to the door 60 of the partition 50 on the edge of the door 60 comprising lock 62, wherein the flanged interlocking molding 80 is secured to the door 60 in the same manner. A shoe 78*a*, 78*b* is arranged at the base of each pilaster 70*a*, 70*b*, surrounding the base of the pilaster 70*a*, 70*b*.

As illustrated in FIGS. 4I and 4K, the door 60 can be configured to open and rotate 90° or more from the closed position shown in the Figures inward (i.e., towards the toilet), and so the flanged interlocking molding 80 is secured to the door 60 such that the flange 82 is arranged on the lock side on the internal face of the door 60 and on the hinge side on the external face of the door 60, such that the flange 82 of the flanged molding 80 does not interfere with the opening and closing of the door 60 by contacting a pilaster 70*a*, 70*b*. For a door 60 that rotates in the opposite direction (i.e., away from the toilet), the orientation of the flanged interlocking molding 80 relative to the door 60 can be reversed. In the "closed" position, the locking element 62 of the door can engage a corresponding locking element 72 on the pilaster 70*b* to lock the door 60.

Figure 5B:
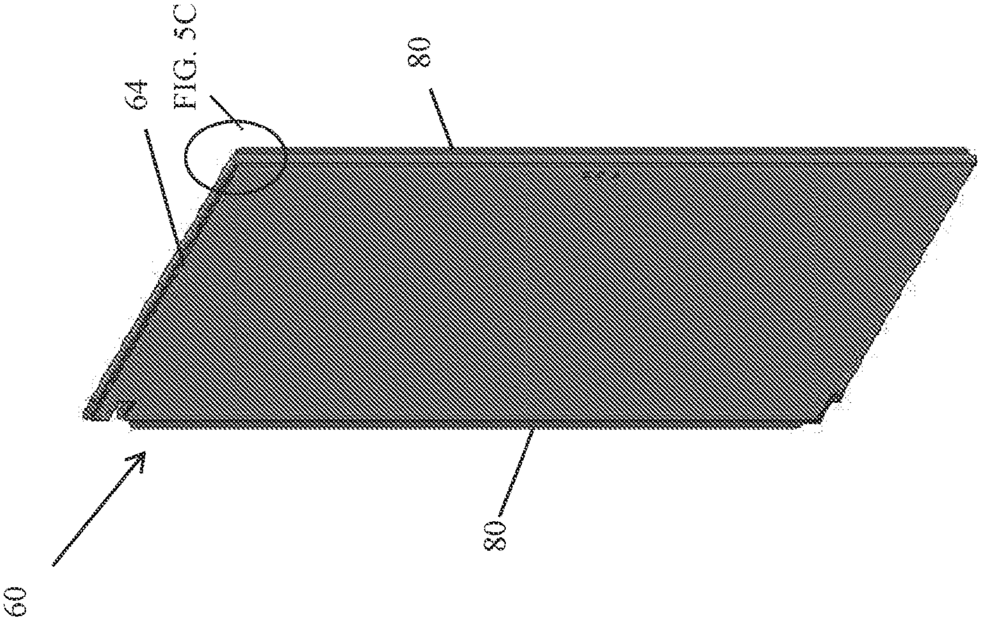
FIG. 5B shows a front perspective view of a door of a toilet partition including a flanged interlocking molding in accordance with an embodiment of the present application.
Figure 5A:
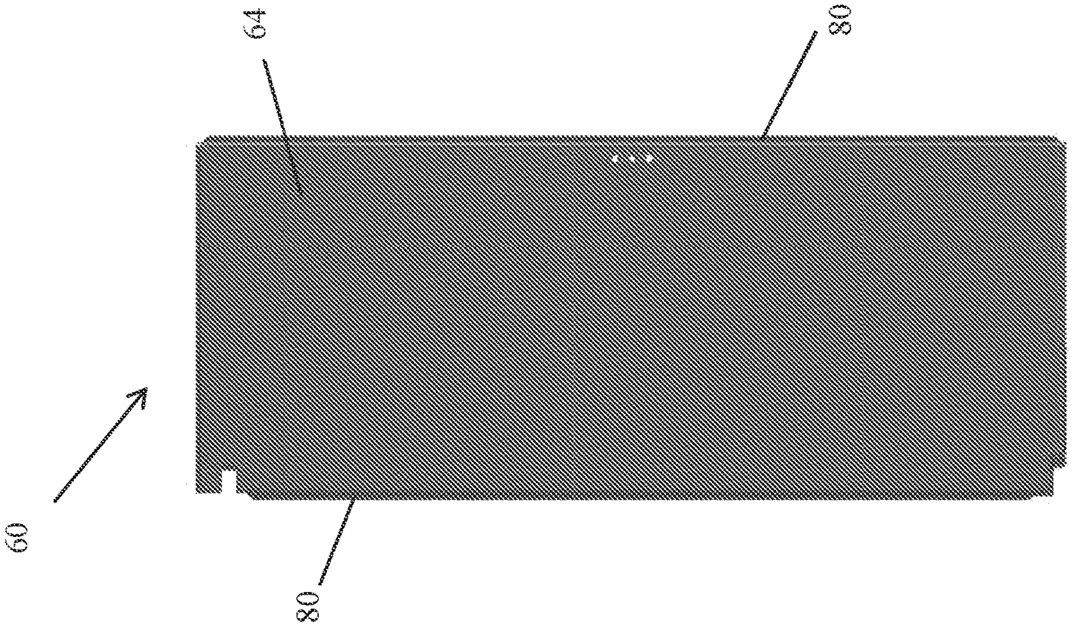
FIG. 5A shows a front view of a door of a toilet partition including a flanged interlocking molding in accordance with an embodiment of the present application.
Figure 5C:
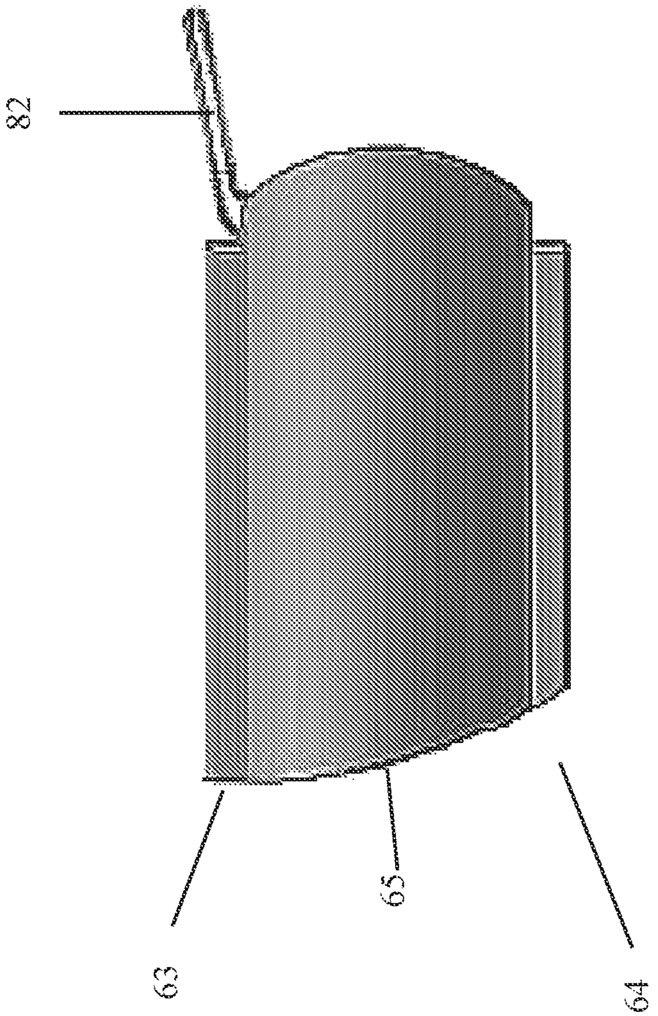
FIG. 5C shows a close-up bottom views of sections of the toilet partition including a flanged interlocking molding identified in FIG. 5B.

FIGS. 5A-5C show various views of a door 60 of a toilet partition 50 having the flanged interlocking molding 80 arranged on each edge of the door 60 in the manner previously described.

While the Figures primarily illustrate the flanged interlocking molding 80 being secured to each edge of the door 60 of the toilet partition 50, the flanged interlocking molding 80 can alternatively be secured to one or both pilasters 70*a*, 70*b* instead of the door 60. In such embodiments, the flanged interlocking molding 80 can be used in place of the standard interlocking molding 76*a*, 76*b* of the pilasters 70*a*, 70*b* to secure the two skins 73*a*, 73*b*, 74*a*, 74*b* of the pilaster 70*a*, 70*b* together, with the flange 82 still being arranged between the door 60 and the pilaster 70*a*, 70*b* to close the sight line gaps 51, 52.

Preferably, the toilet partition 50 comprises one flanged interlocking molding 80 on each side of the door 60, the hinge side (i.e., the side of the door comprising or connected to one or more hinges where a sightline gap 51 would form) and the locking side (i.e., the opposite side, generally adjacent to or comprising a closure or locking element such as lock 62, where a sightline gap 52 would form). For example, the toilet partition 50 may comprise: (i) a flanged interlocking molding 80 secured to each of the hinge side and the locking side of door 60; (ii) a flanged interlocking molding 80 secured to the hinge side of the door 60 and a flanged interlocking molding 80 secured to the pilaster 70*b* along the edge adjacent to the locking side of the door 60; (iii) a flanged interlocking molding 80 secured to the lock side of the door 60 and a flanged interlocking molding 80 secured to the pilaster 70*a* (the pilaster adjacent to the hinge side of the door 60); (iv) a flanged interlocking molding 80 secured to each of the pilasters 70*a*, 70*b* along their respective edges adjacent to the door 60.

Additionally, the flanged interlocking molding 80 can also be provided on one or both panel walls (not shown) of a toilet partition 50. The panel wall generally comprises a similar structure as the pilaster 70*a*, 70*b* or door 60, including a pair of skins having a core in between, with an interlocking molding locking the skins and core in place. A sightline may also be formed in between a panel wall and a pilaster 70*a*, 70*b*, which are arranged perpendicular to each other. A flanged interlocking molding 80 can be provided on an edge of a panel wall adjacent to the pilaster 70*a*, 70*b* to close this sightline and provide further privacy.

The flanged interlocking molding 80 can also be used in combination with other panel, door or wall like structures through which a sightline may form that can be blocked by the flange 82 of the flanged interlocking molding 80, such as shower partitions, urinal partitions, and other doors or panels.

FIGS. 6A-6H show various views of flanged interlocking moldings 80 combining as one piece an interlocking molding 81 and an integral flange 82. The flanged interlocking molding 80 is made from a single piece of metallic material, such as a stainless steel or other metal, including but not limited to galvanneal, 300 series stainless steel or other series of stainless steel, which is rolled into a shape illustrated in the Figures comprising the interlocking molding 81 and flange 82. The cross-sectional profile of the flanged interlocking molding 80 is consistent along its length.

Figure 6A:
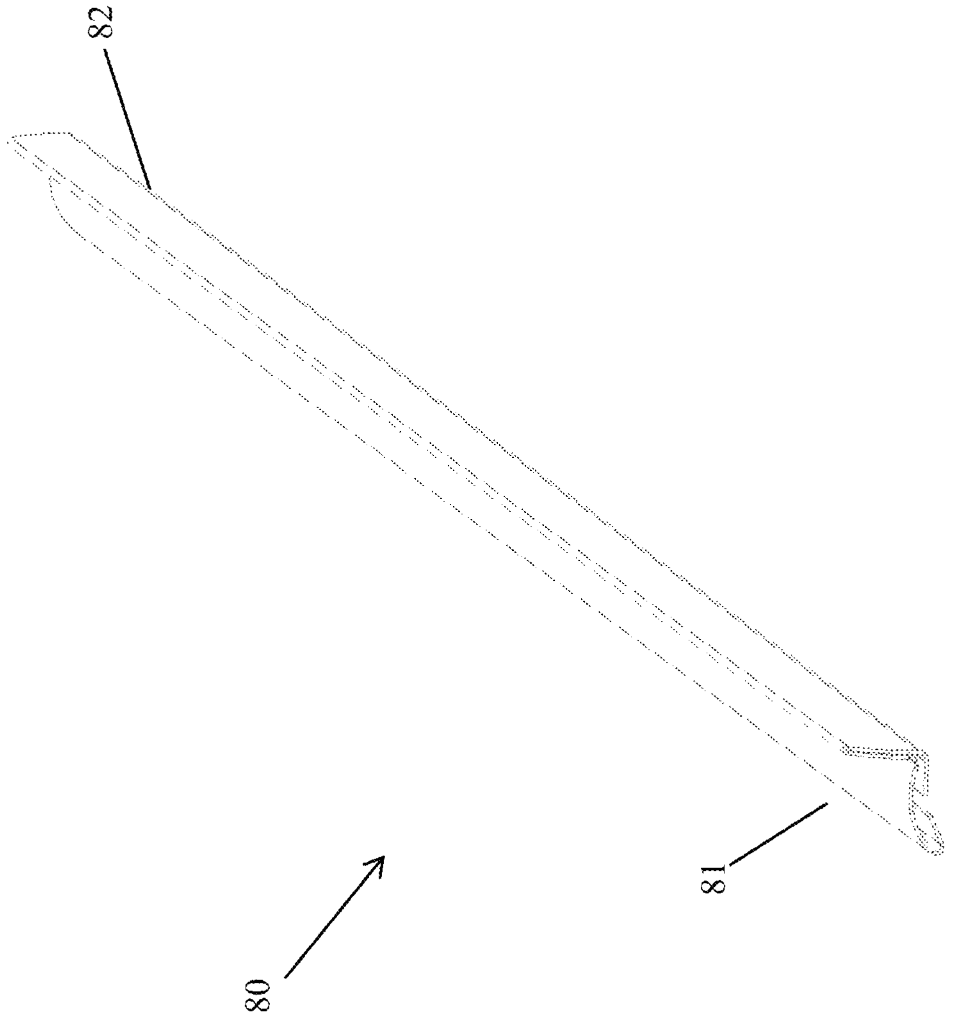
FIG. 6A-6H show various views of flanged interlocking moldings for a toilet partition in accordance with an embodiment of the present application.
Figures 6B, 6C:
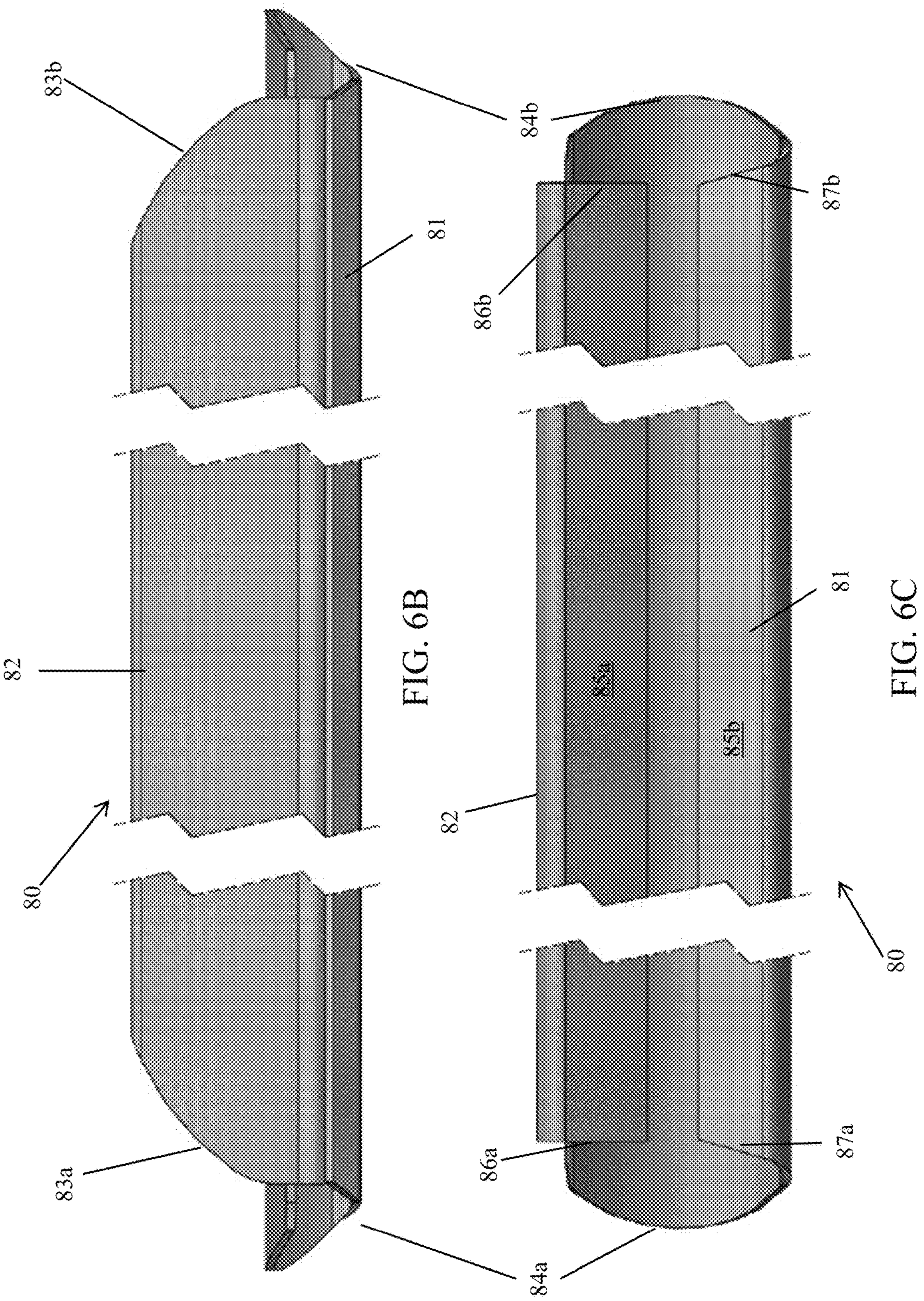
Figure 6E:
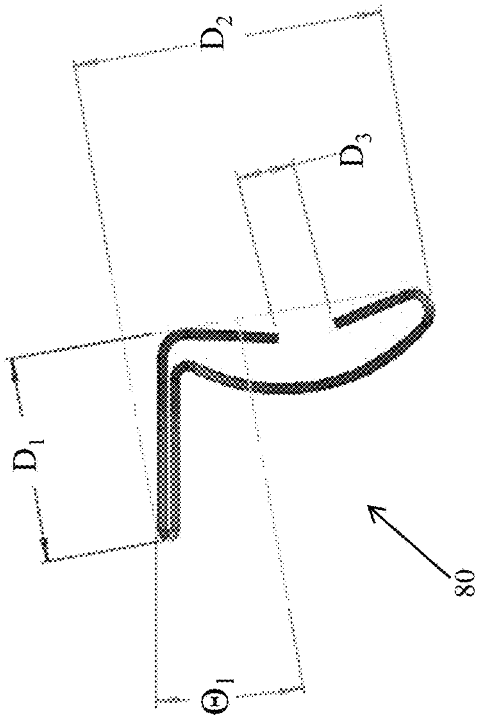
Figure 6F:
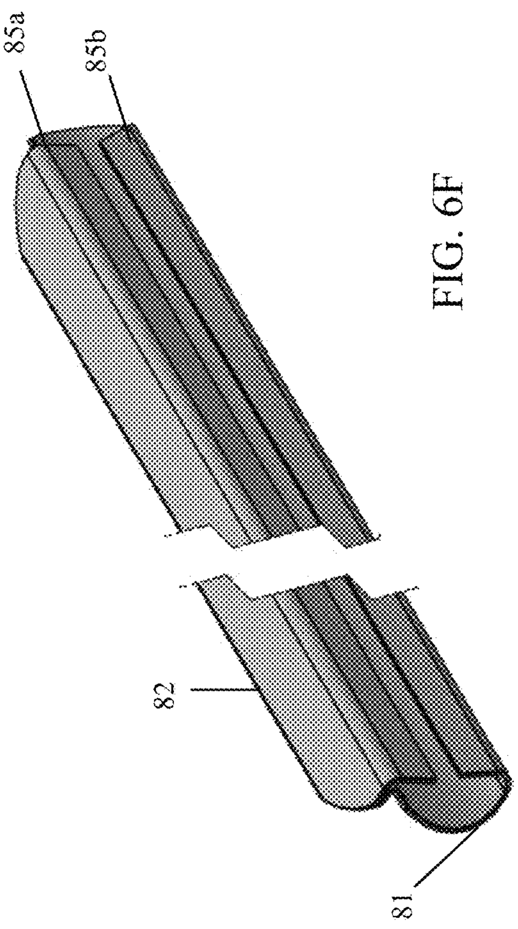
Figure 6D:
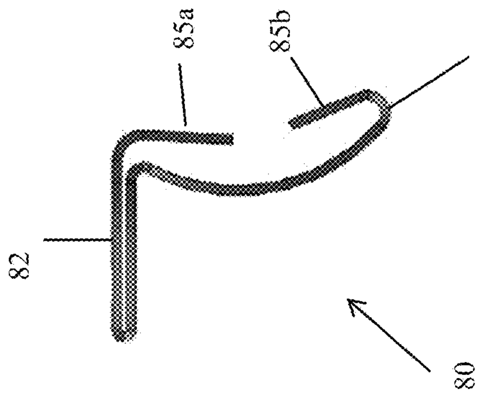
Figure 6G:
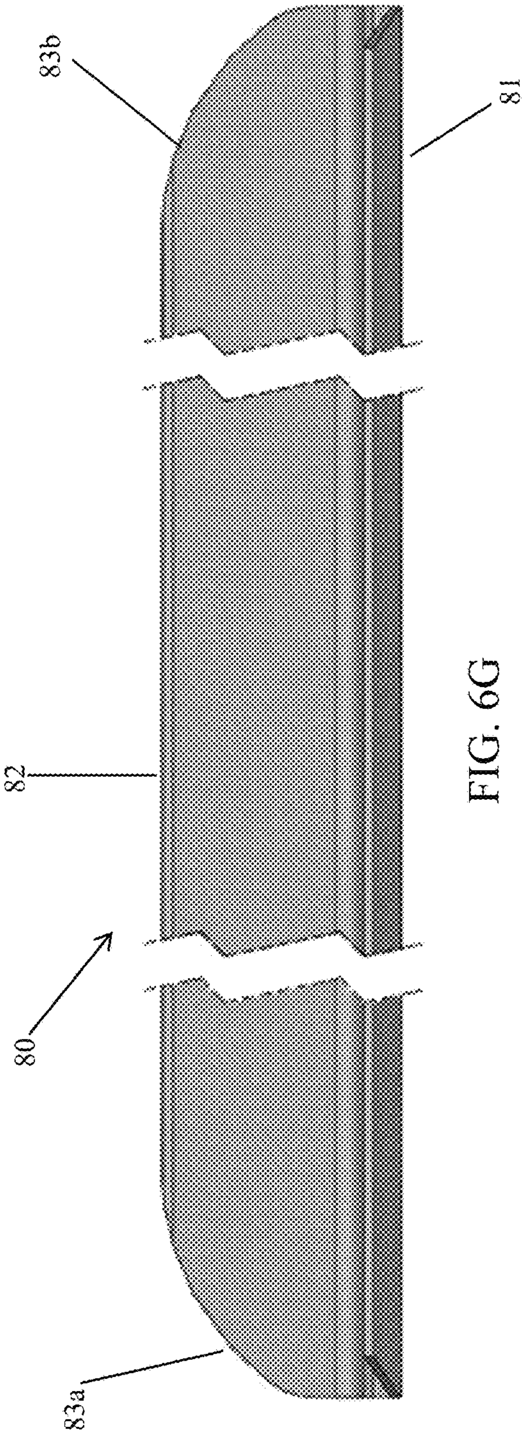
Figure 6H:
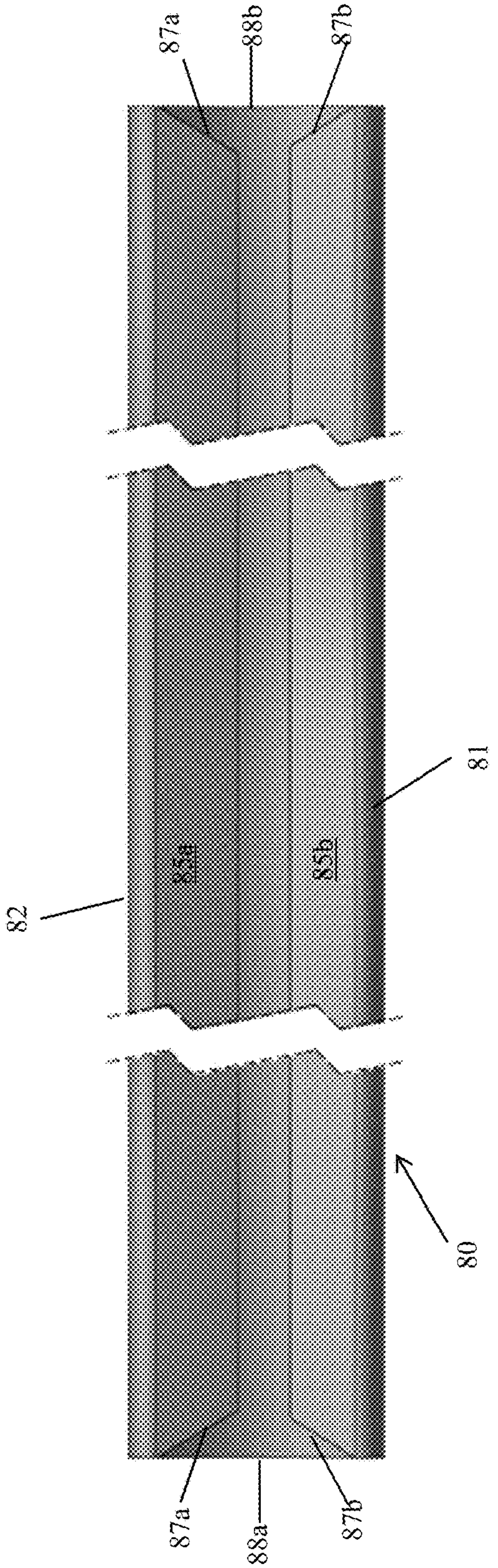

Examples of a flanged interlocking molding 80 formed with a processing step by a double straight die 122 are shown in FIGS. 6A, 6G, and 6H, and examples of a flanged interlocking molding 80 formed with a processing step by a double miter die 123 are shown in FIGS. 6B, 6C, and 6F, as discussed further below. As shown for example in the cross-sectional view of FIGS. 6D and 6E, the interlocking molding 81 of the flanged interlocking molding 80 includes a curved body portion, which at one end includes a sharp bend where the flange 82 is formed as a wing off of outer surface the body portion by rolling the metal into a hairpin shape terminating in one arm 85*a* of the interlocking molding 81, the arm 85*a* opposing an inner surface of the body portion. The flanged interlocking molding 80 is formed from a contiguous material and profile from one arm 85*a* of the interlocking molding 81 to the opposing, adjacent arm 85*b* with the flange 82 formed therebetween. In the embodiment illustrated in the Figures, the width ($D_2$) of the flanged interlocking molding 80 may be approximately one inch, the width ($D_1$) of the flange 82 may be approximately 0.6 inches (with the actual length of the flange 82 being slightly greater) and the distance between the arms 85*a*, 85*b* of the interlocking molding ($D_3$) may be approximately 0.2 inches. The flange 82 may be formed at an angle ($\Theta_1$) of approximately 10±relative to a reference plane (corresponding to the line at the bottom of the "D1" label adjacent to the arms), passing through a base of each of the arms 85*a*, 85*b*. In alternative embodiments of the flanged interlocking molding 80, the dimensions may vary. Further, while the Figures illustrate the body portion of the flanged interlocking molding 80 as having an outer surface having a convexly curved cross-sectional profile, the cross-sectional profile shape may vary flanged interlocking molding 80.

The flanged interlocking molding 80 may also be manufactured in alternative manners. For example, the flanged interlocking molding 80 can be made of aluminum and can further be made by way of an aluminum extrusion process.

In order to achieve the final profile for the interlocking molding 80 with flange 82, as shown in FIGS. 4A-6H and described above, a manufacturing process and system have been developed. There are several unique design characteristics that must be achieved by the flanged interlocking molding 80, which are attained through the process and system described herein and illustrated in FIGS. 7A-13D. In order to accomplish this process of creating the flanged interlocking molding 80, a roll forming assembly apparatus 100 is provided comprising a series of fourteen dies (101-114) to form the flat steel.

Figure 7A:
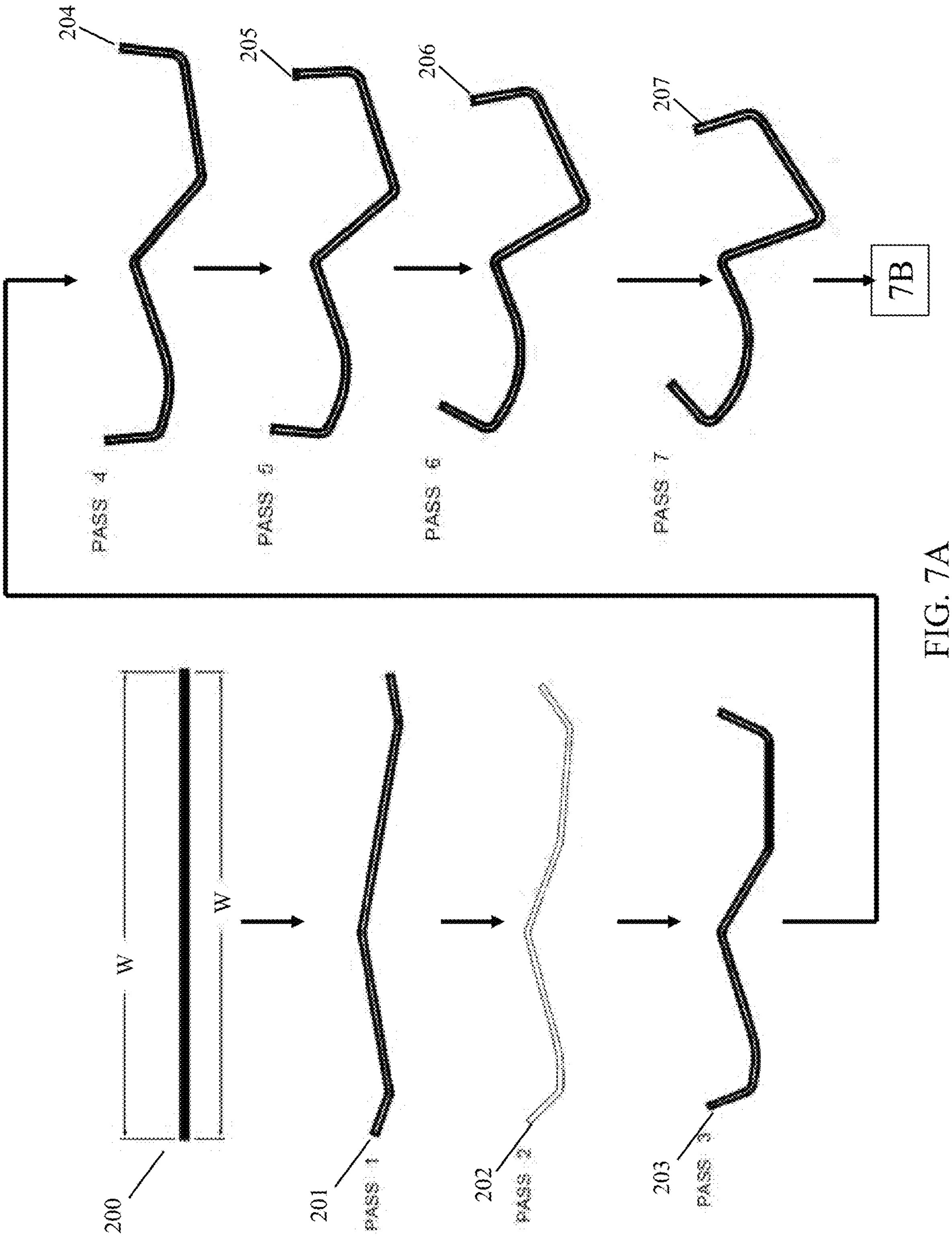
FIGS. 7A-7B show a diagram of the profile changes in the process of creating the flanged interlocking molding from a metallic strip in accordance with an embodiment of the present application.
Figure 7B:
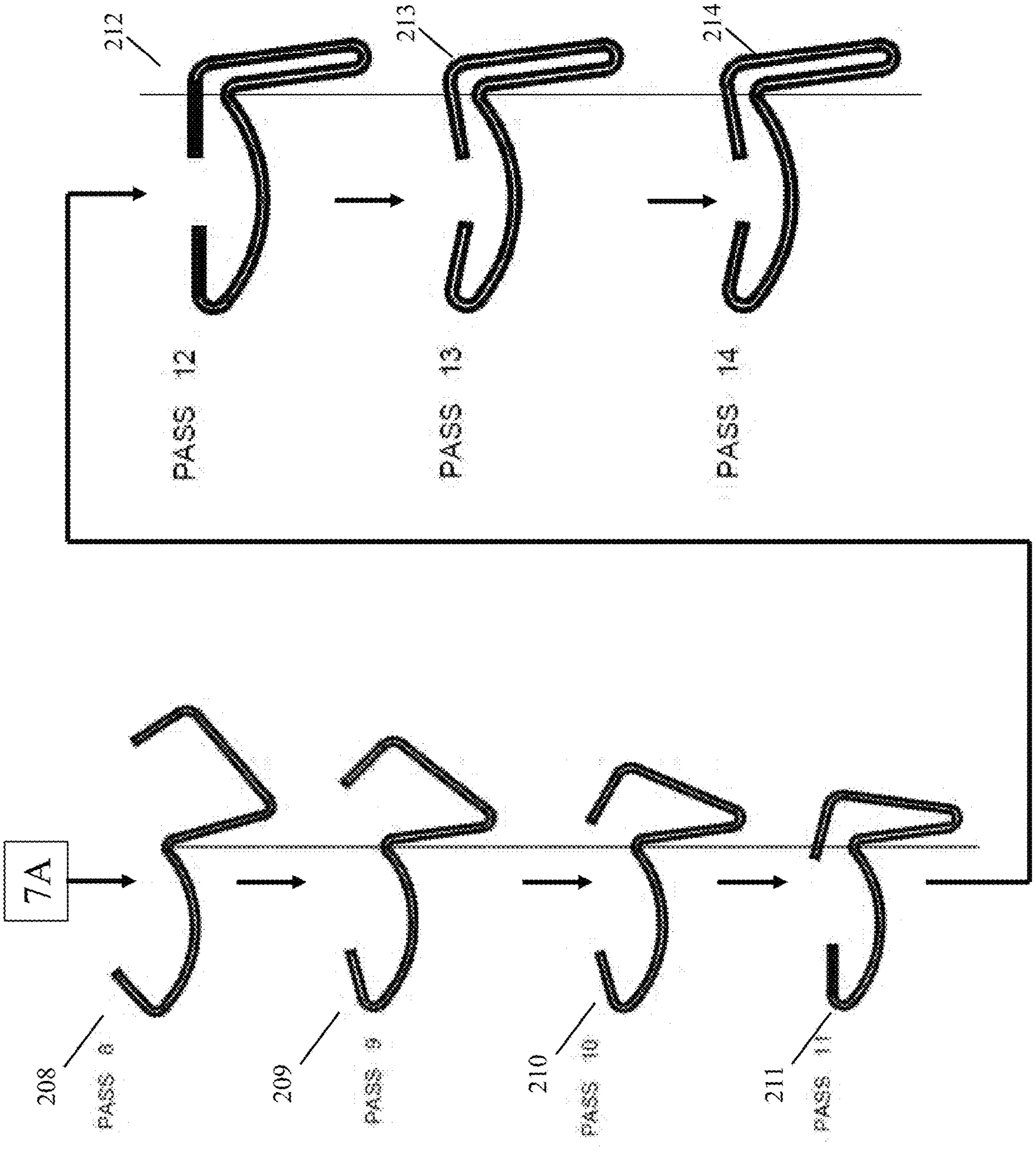

FIGS. 7A-7B show a diagram of the changes in the profile of the metallic strip 200 through the process of forming the flanged interlocking molding 80 shown and described herein. The strip 200 begins with a flat profile having a width (W) of 2.665 inches and progresses through a series of modified profiles 201-214 as the strip passes through the fourteen tools or dies (101-114) of the assembly apparatus 100.

Figure 8A:
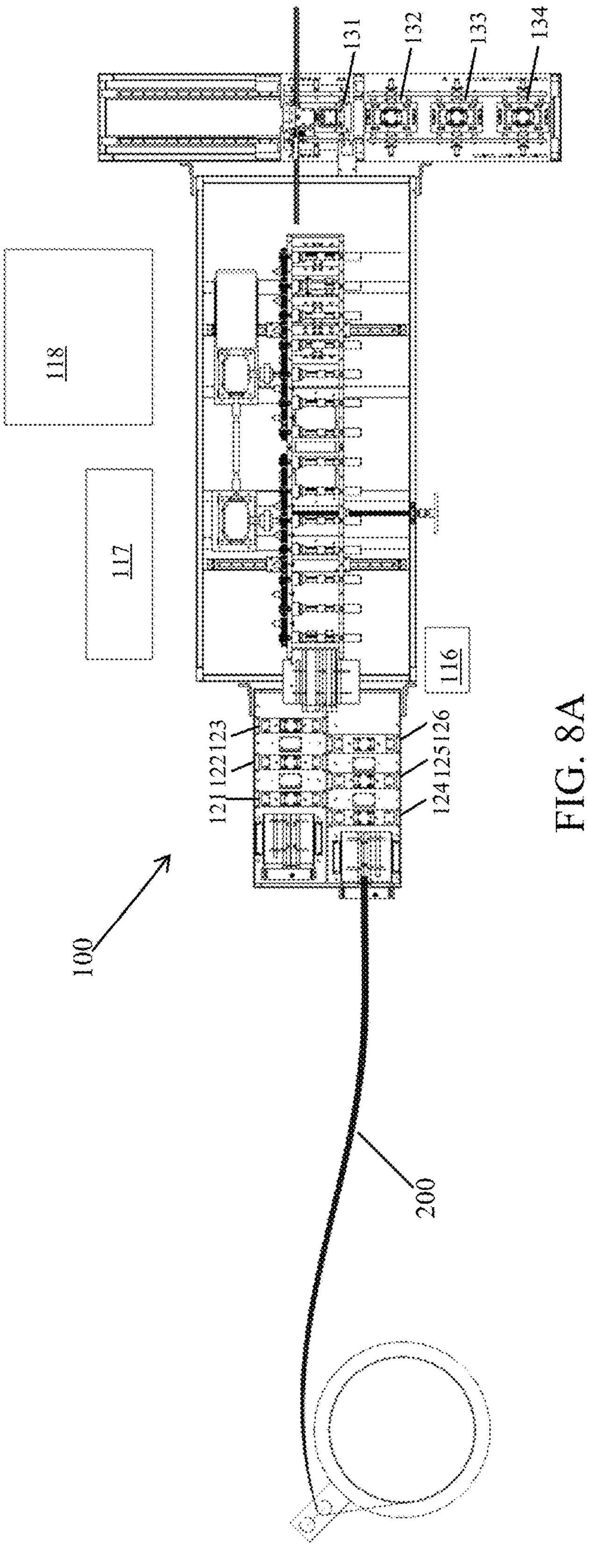
FIG. 8A shows a top view of a roll forming assembly apparatus used in the process of creating the flanged interlocking molding in accordance with an embodiment of the present application.
Figure 8B:
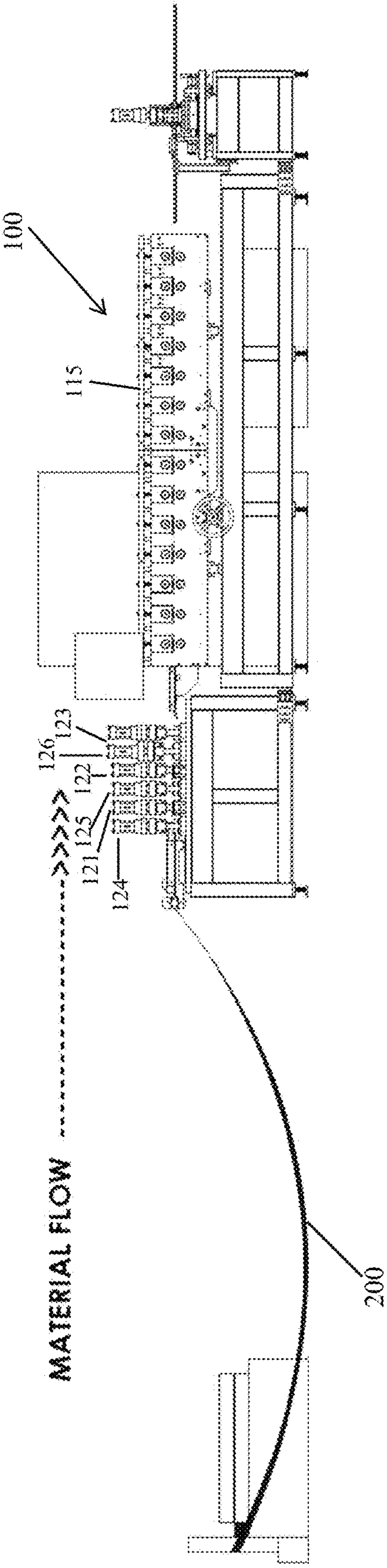
FIG. 8B shows a side view of a roll forming assembly apparatus used in the process of creating the flanged interlocking molding in accordance with an embodiment of the present application.

As shown in FIGS. 8A-8B, the roll forming assembly apparatus 100 includes a roll former 115 comprising the fourteen dies 101-114. The assembly further includes a control panel 116, an electric panel 117 and a hydraulic power unit 118. Before the roll former 115 (in the direction of the flow of the strip 200 through the apparatus), a series of tools including a no-sight latch hole die 121, a no-sight double straight die 122, and a no-sight double miter die 123 is provided, as well as a series of tools including a traditional hanger hole die 124, a traditional latch hole die 125, and a traditional pre-notch die 126 is provided. The two series of tools can be used interchangeably depending on the final intended form of the flanged interlocking molding. After the roll former 115 (in the direction of the flow of the strip 200 through the roll forming assembly apparatus 100), a further series of tools including a no-sight cut off die 131, a traditional miter straight cut off die 132, a traditional double straight cut off die 133, and a traditional double miter cut off die 134 is provided.

Figure 9B:
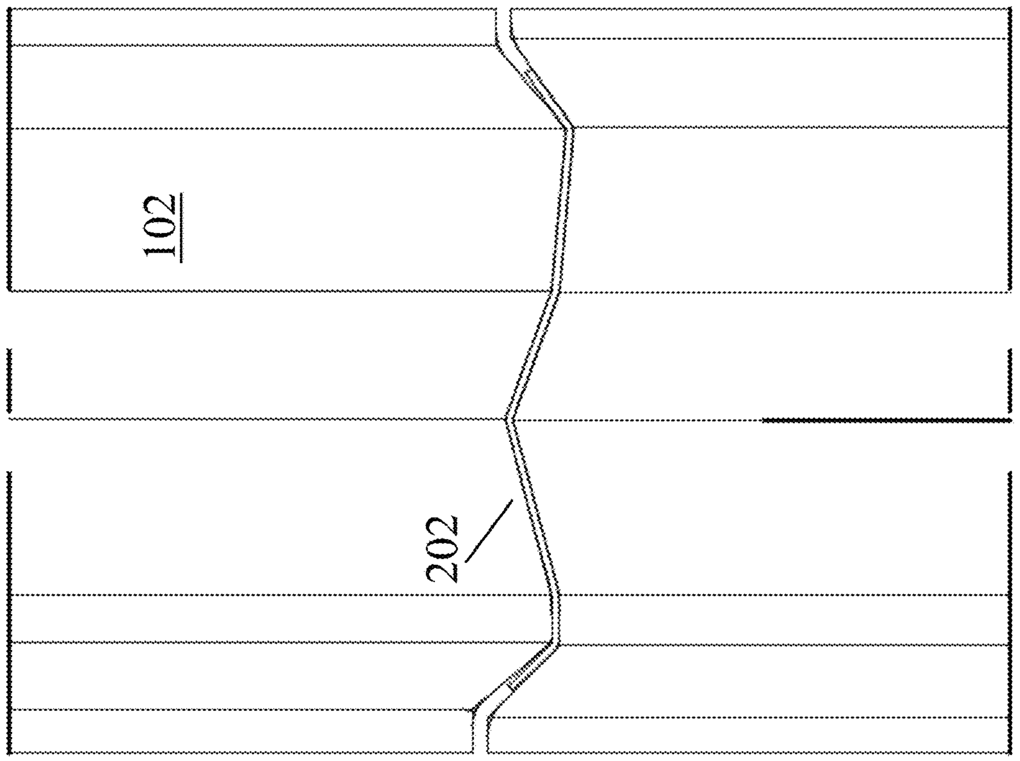
FIGS. 9A-9O show side views of the different tooling dies and sheet configurations created by the tooling dies from the process of creating the flanged interlocking molding in accordance with an embodiment of the present application.
Figure 9A:
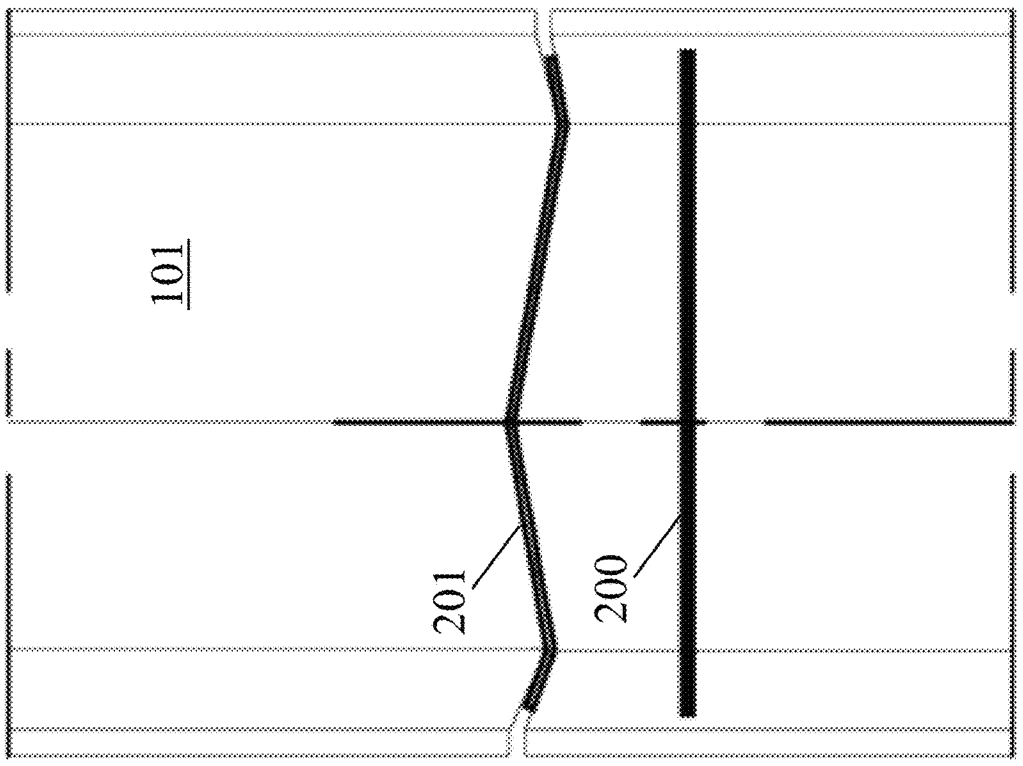
Figure 9D:
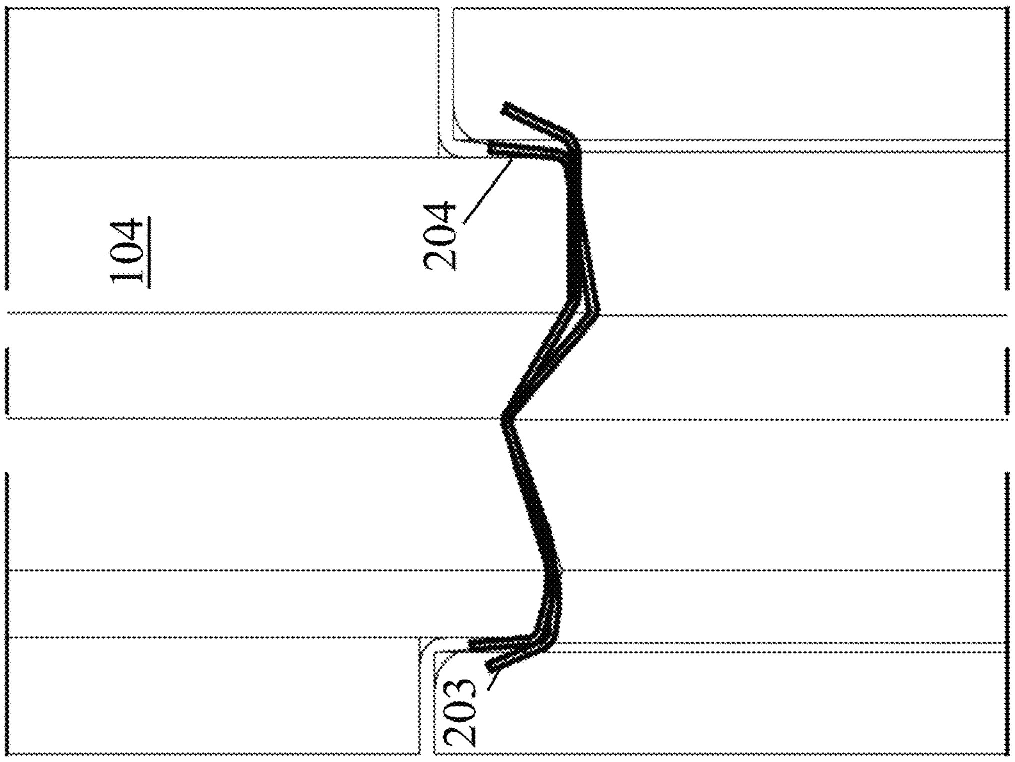
Figure 9C:
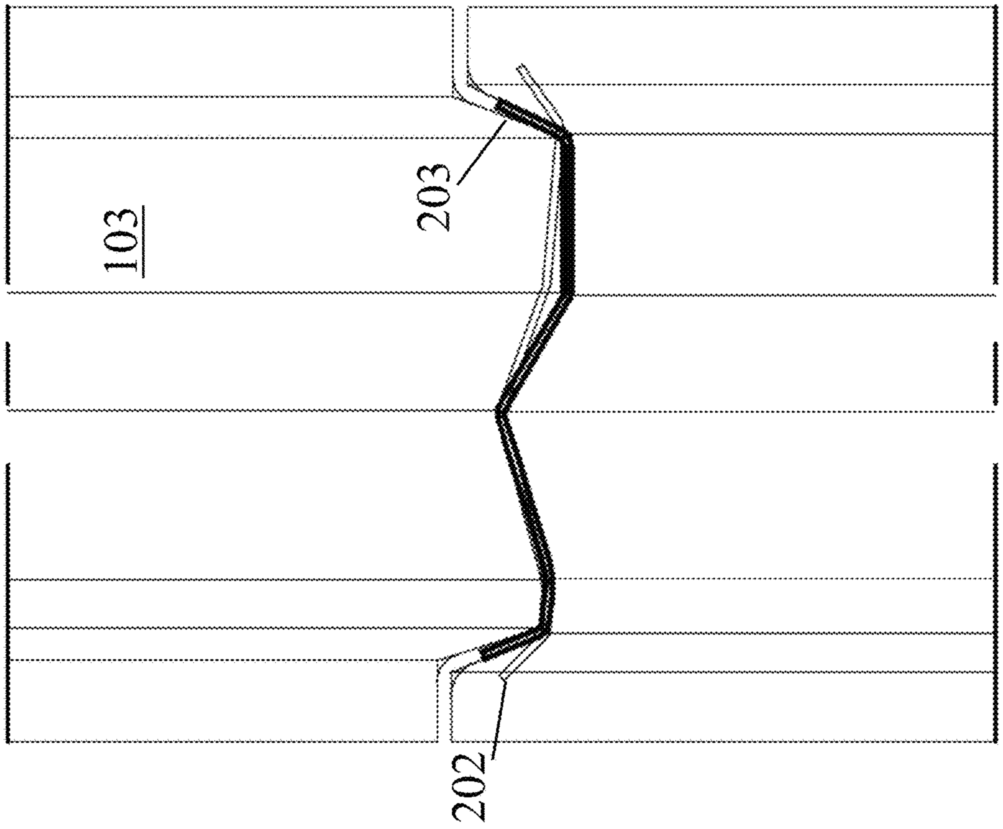
Figure 9E:
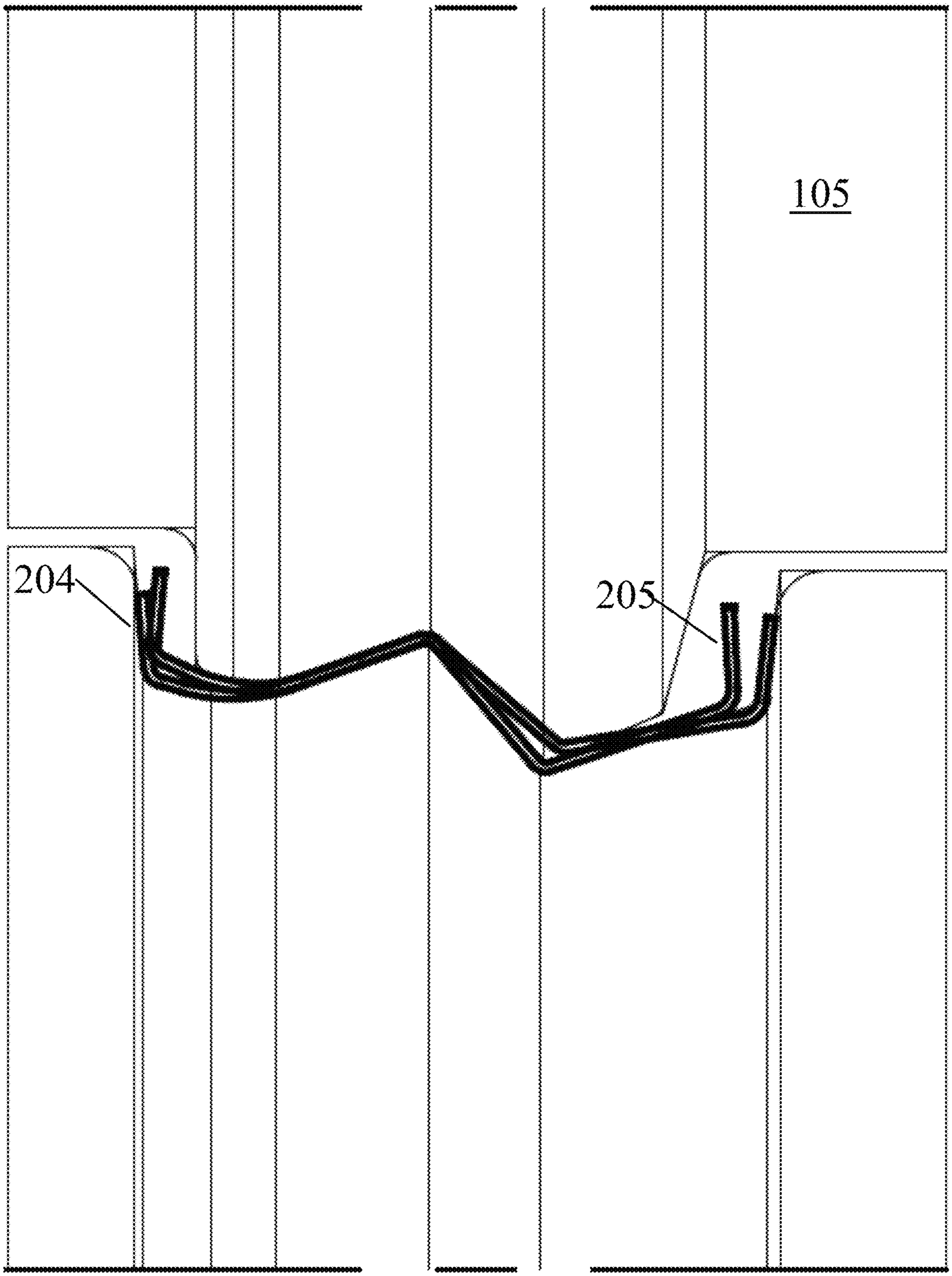
Figure 9F:
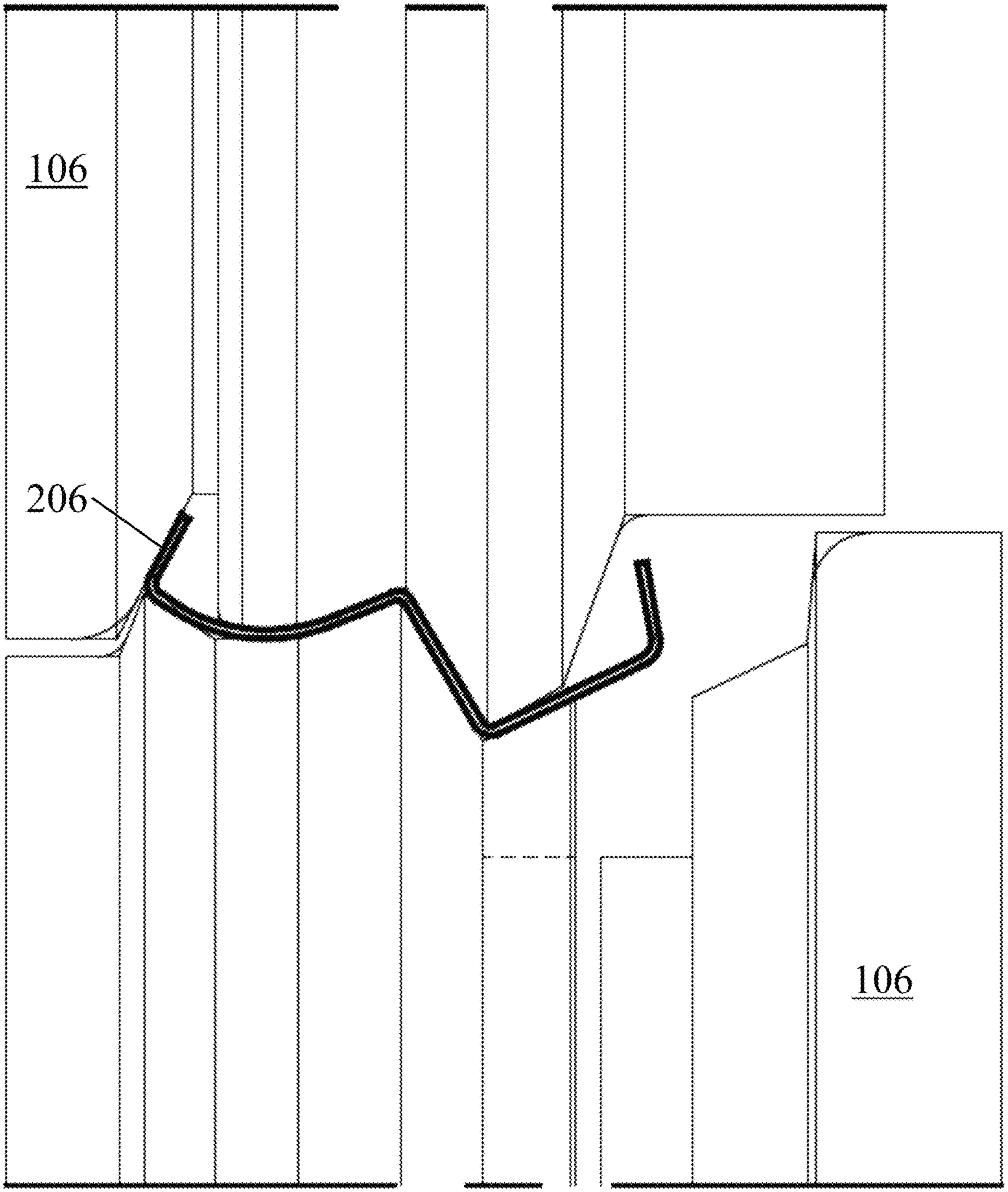
Figure 9G:
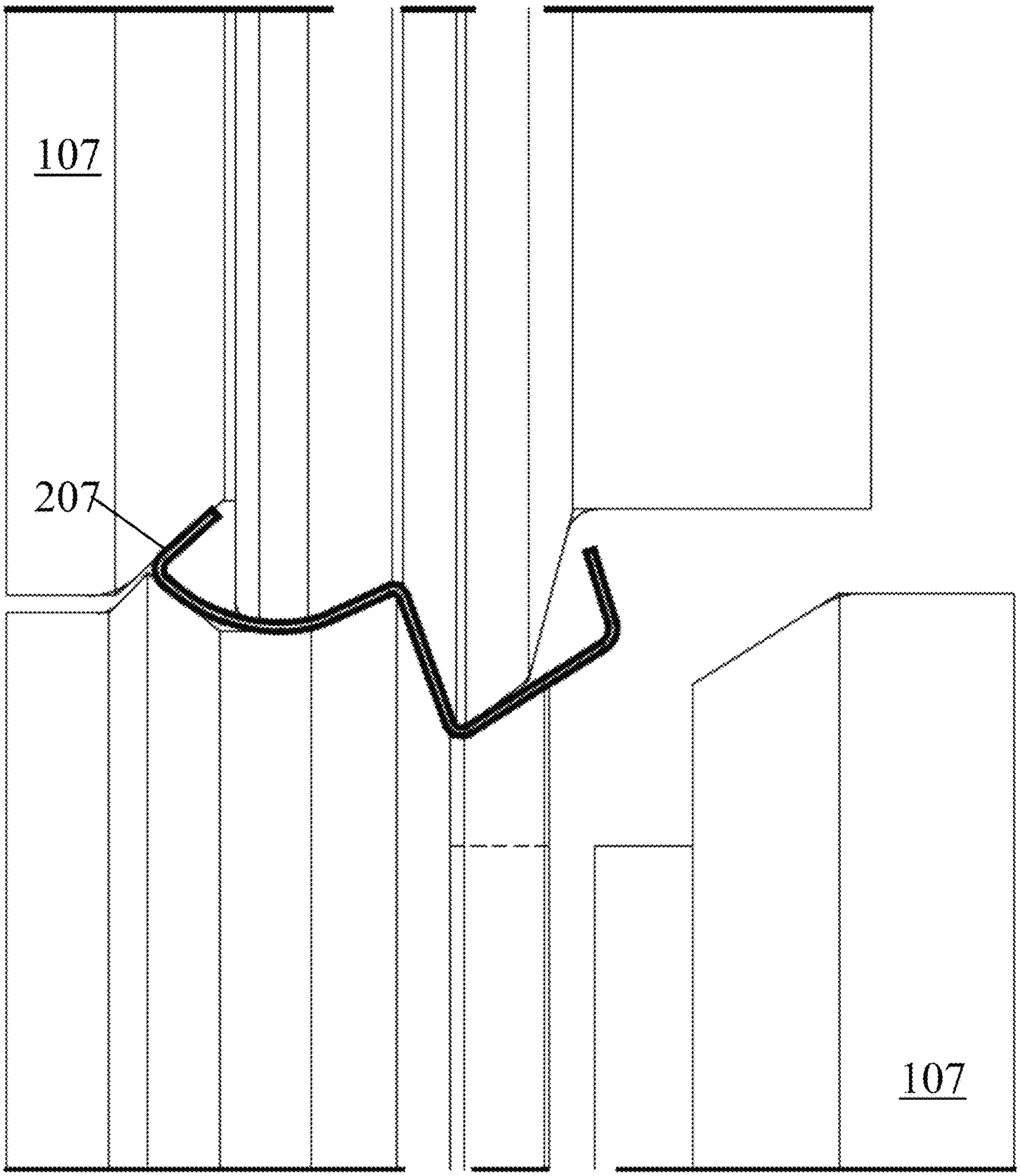
Figure 9H:
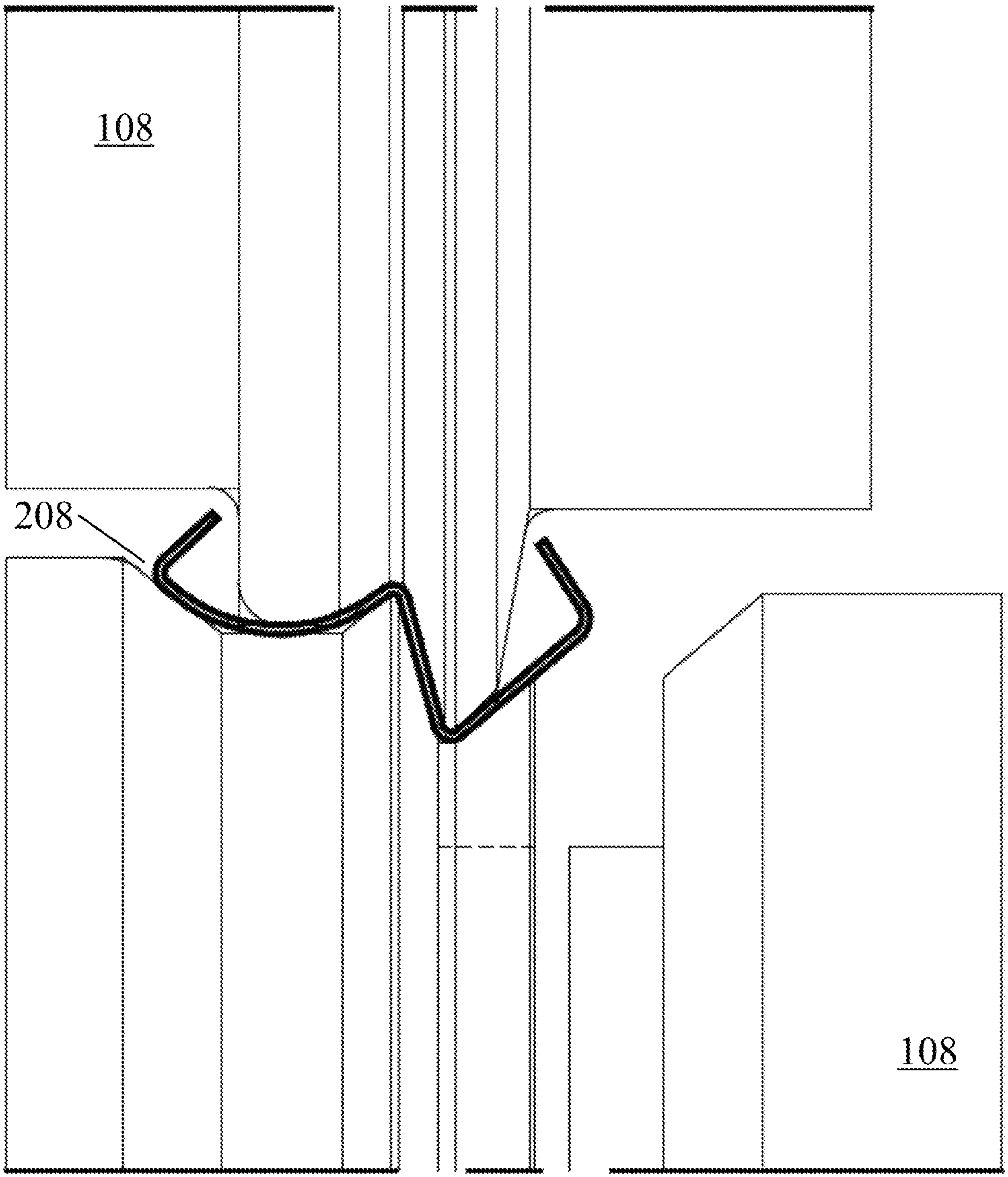
Figure 9I:
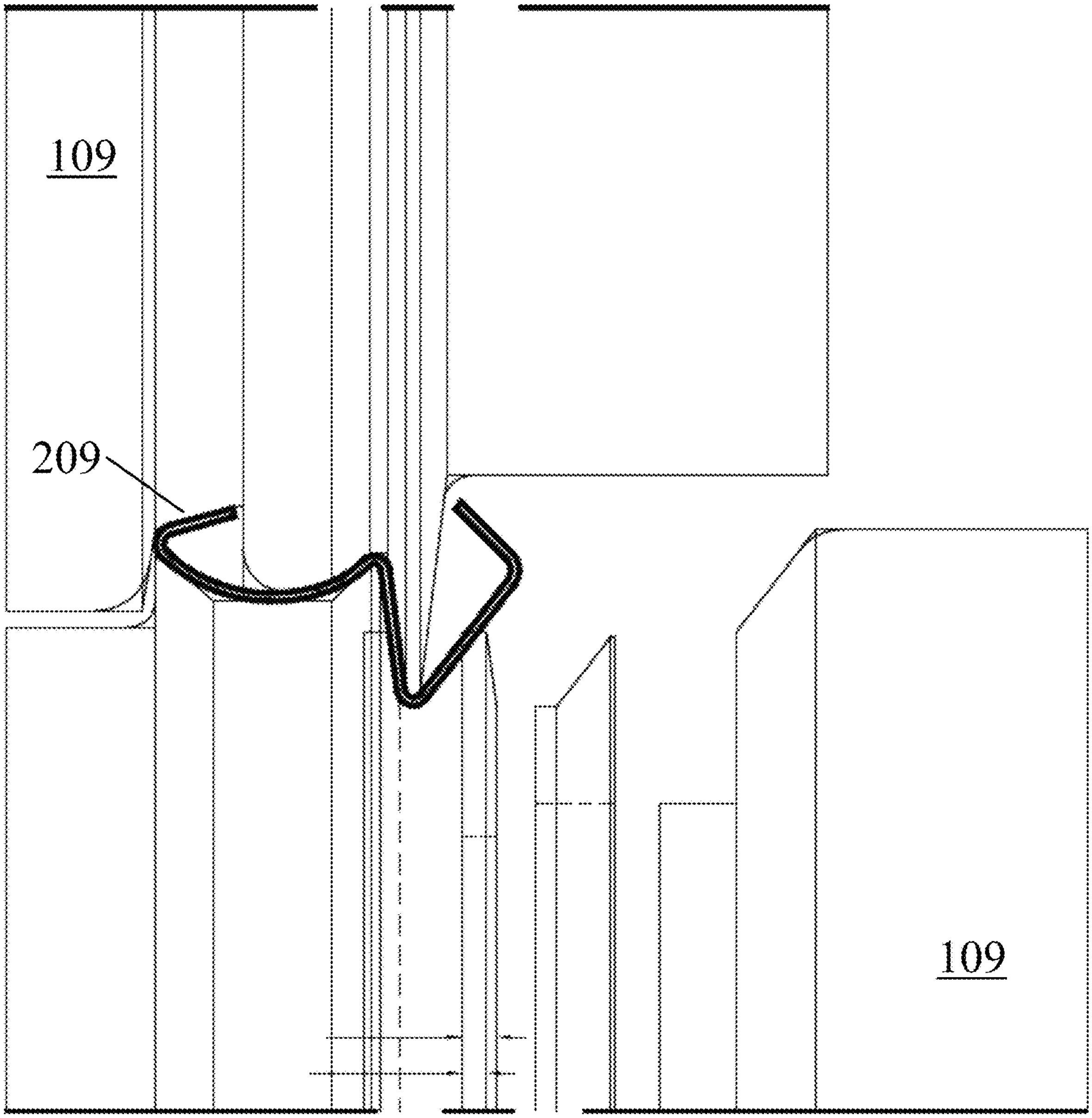
Figure 9J:
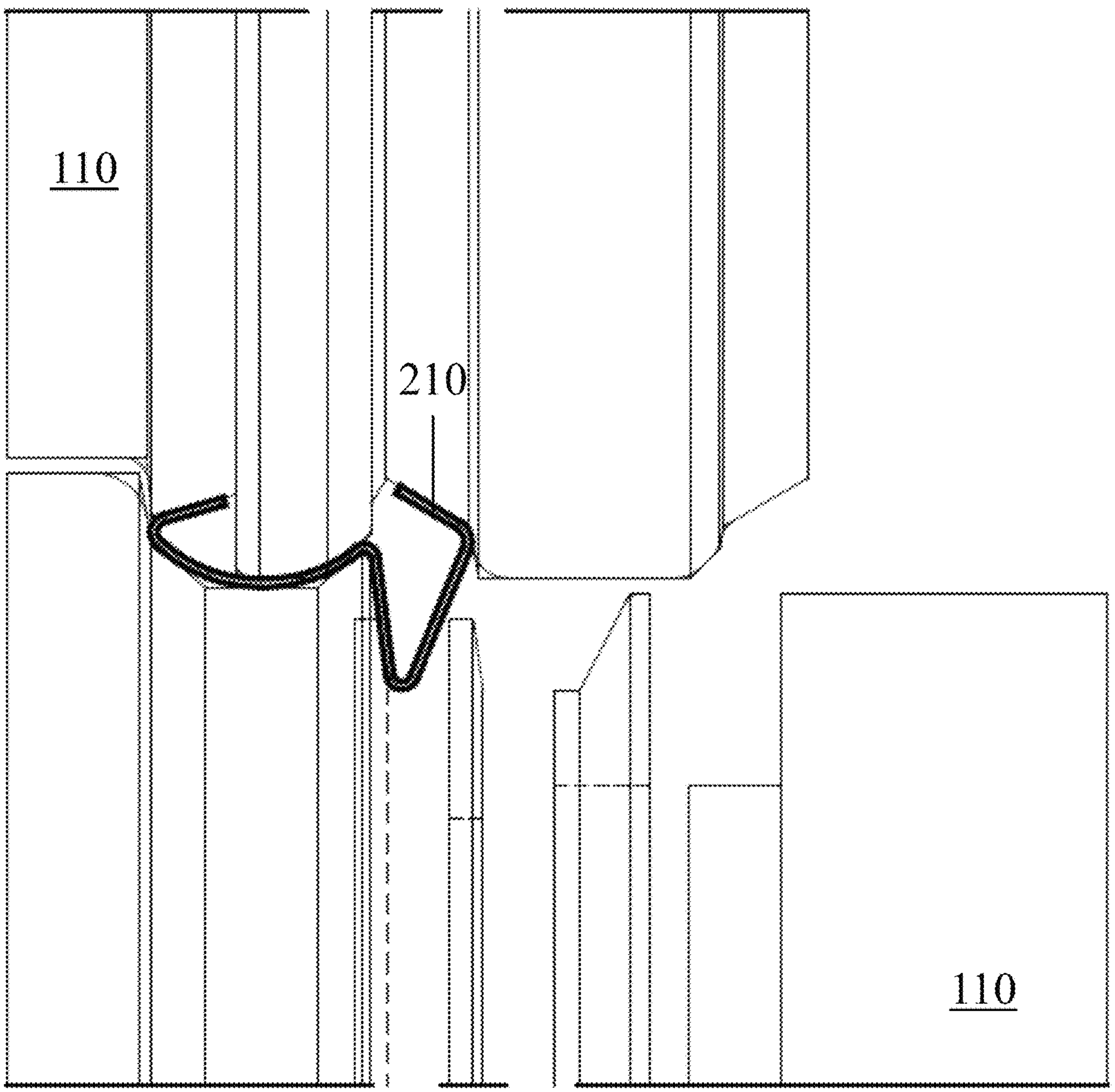
Figure 9K:
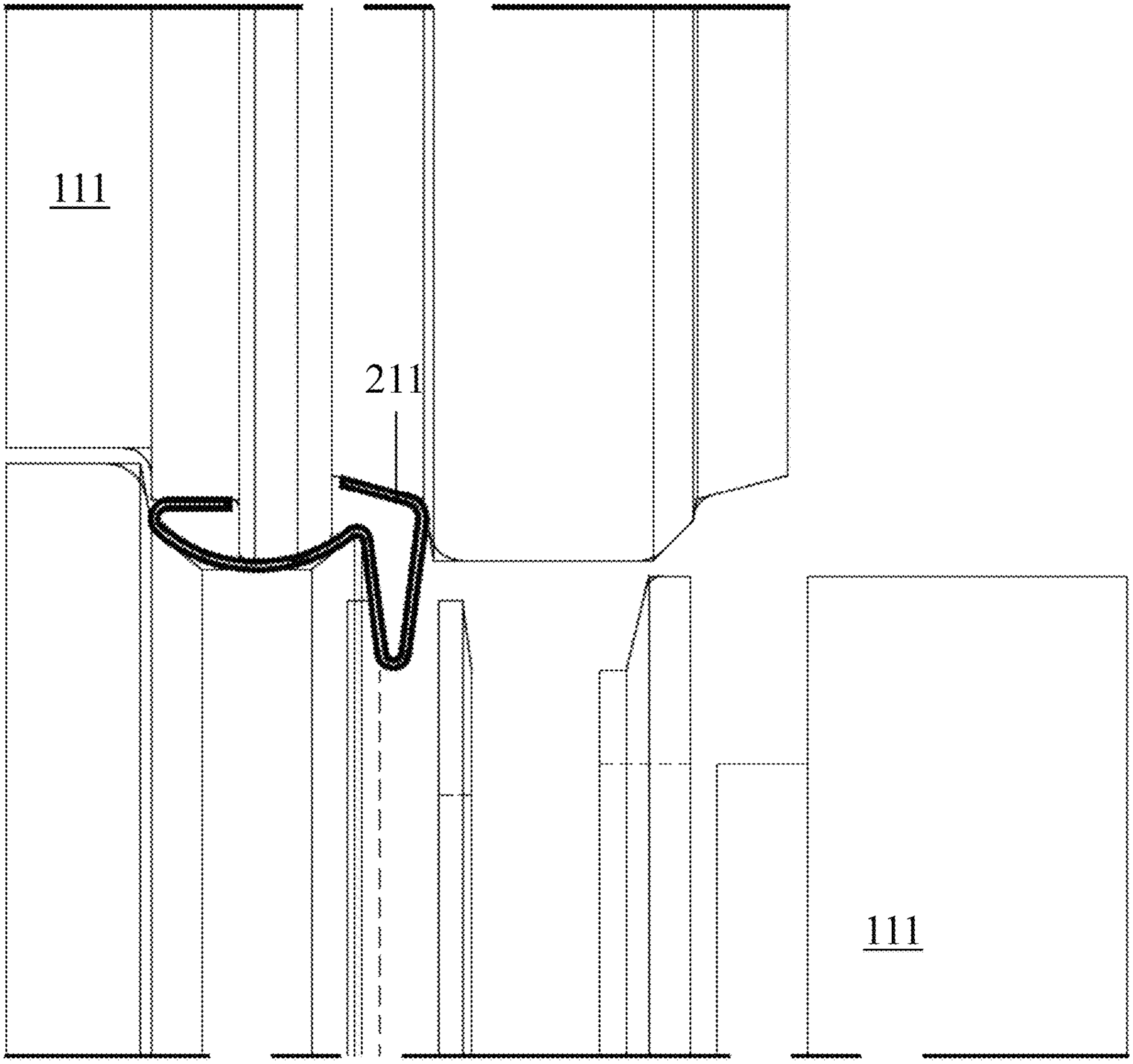
Figure 9L:
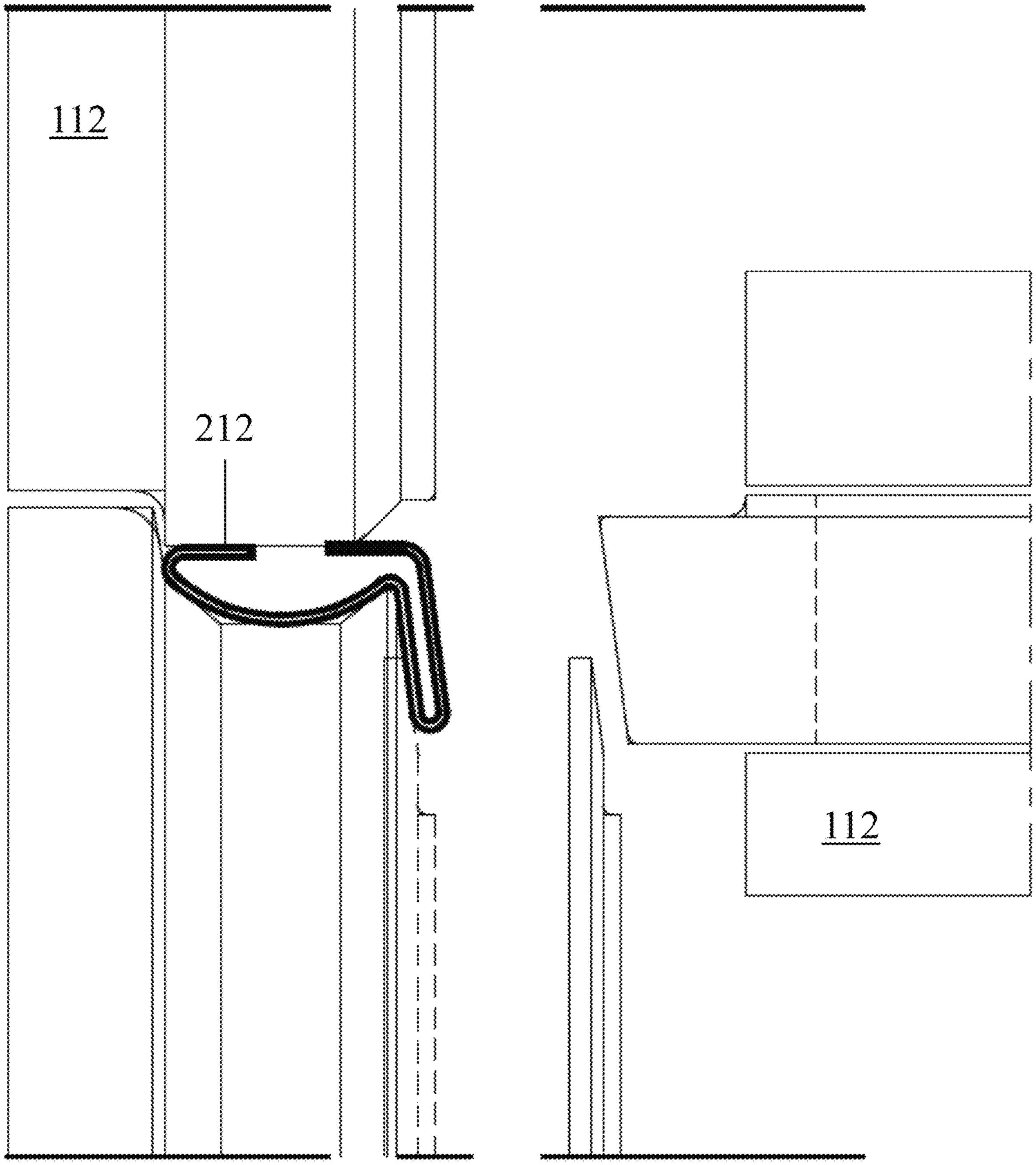
Figure 9M:
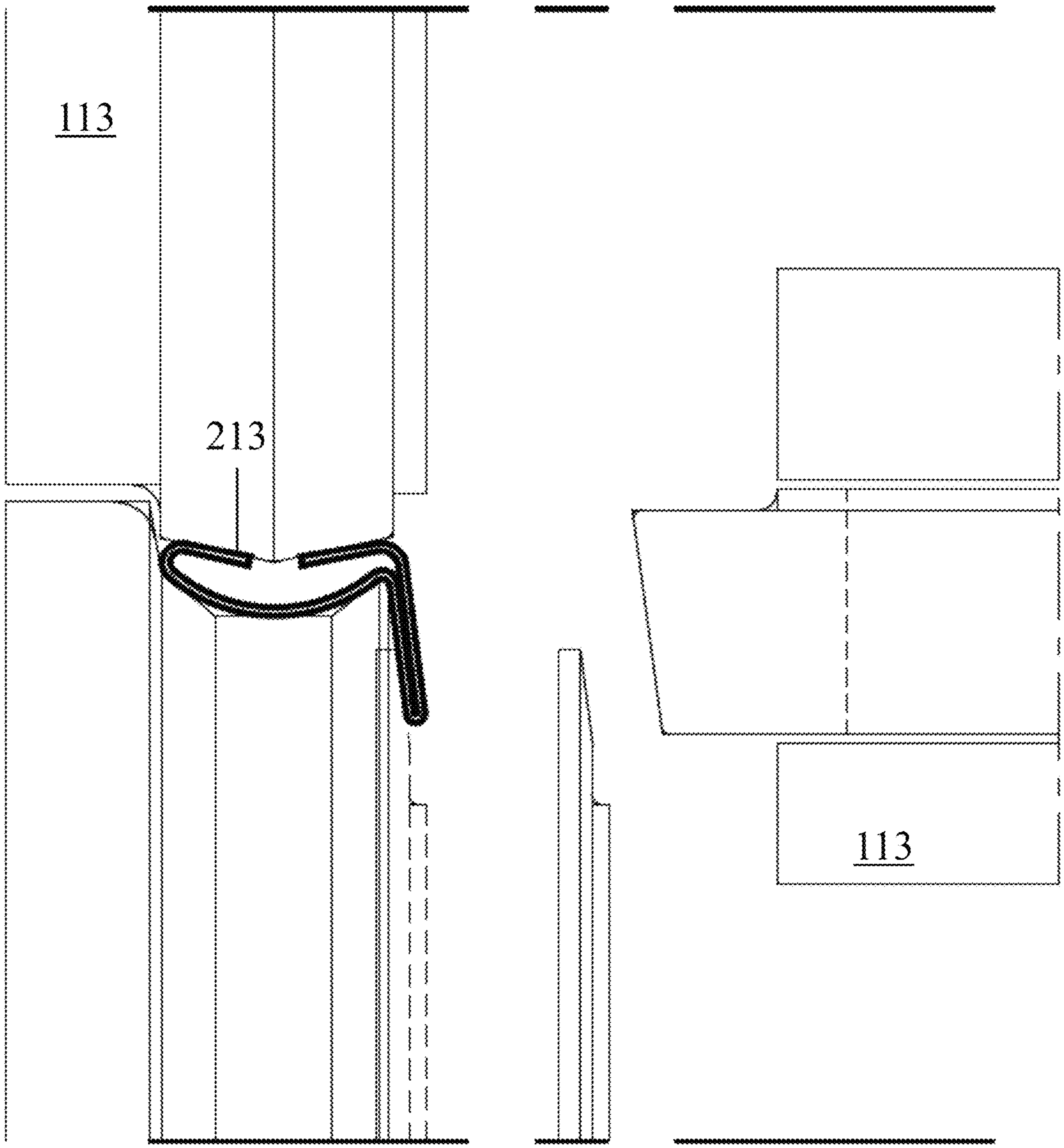
Figure 9N:
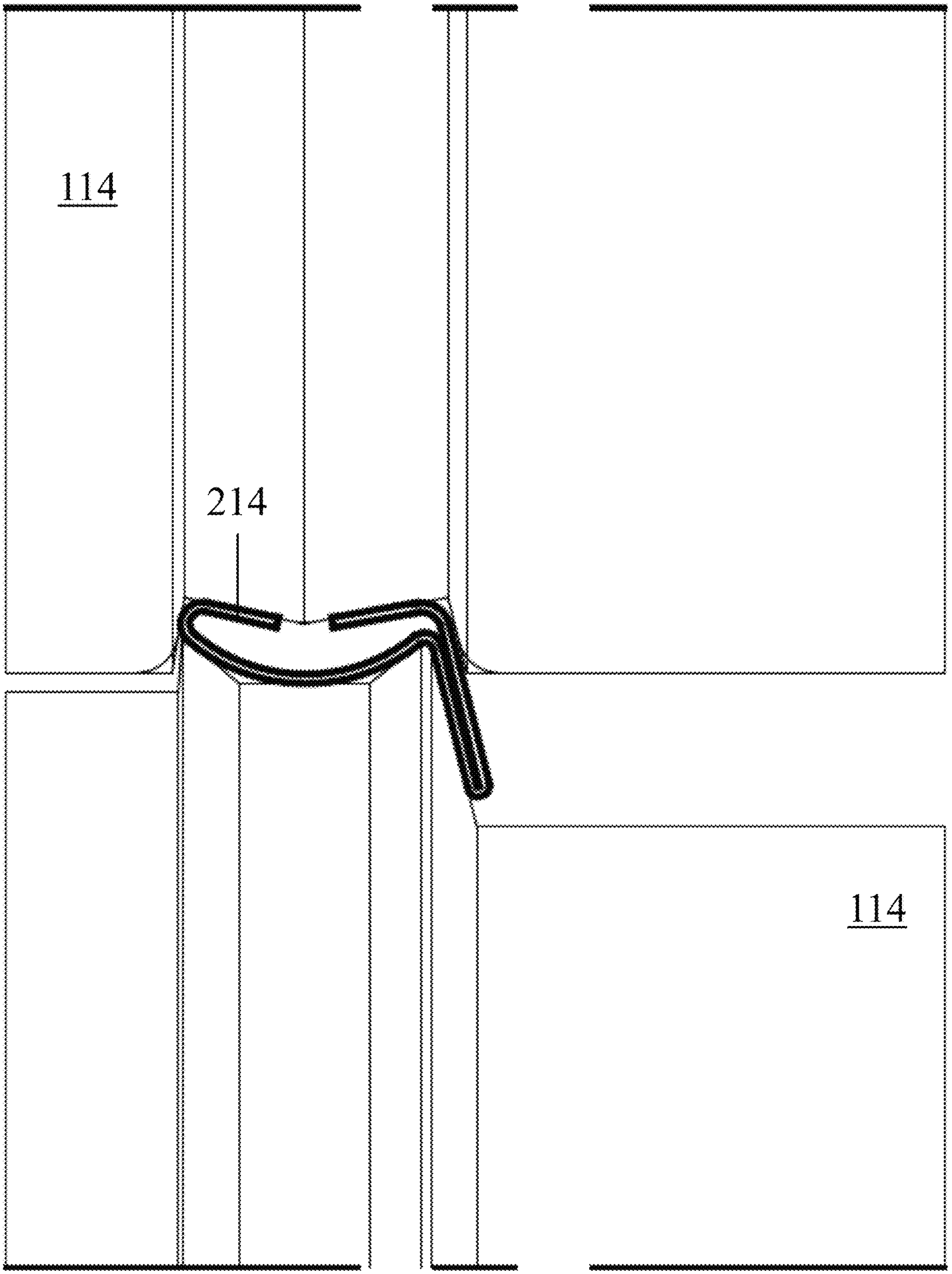
Figure 9O:
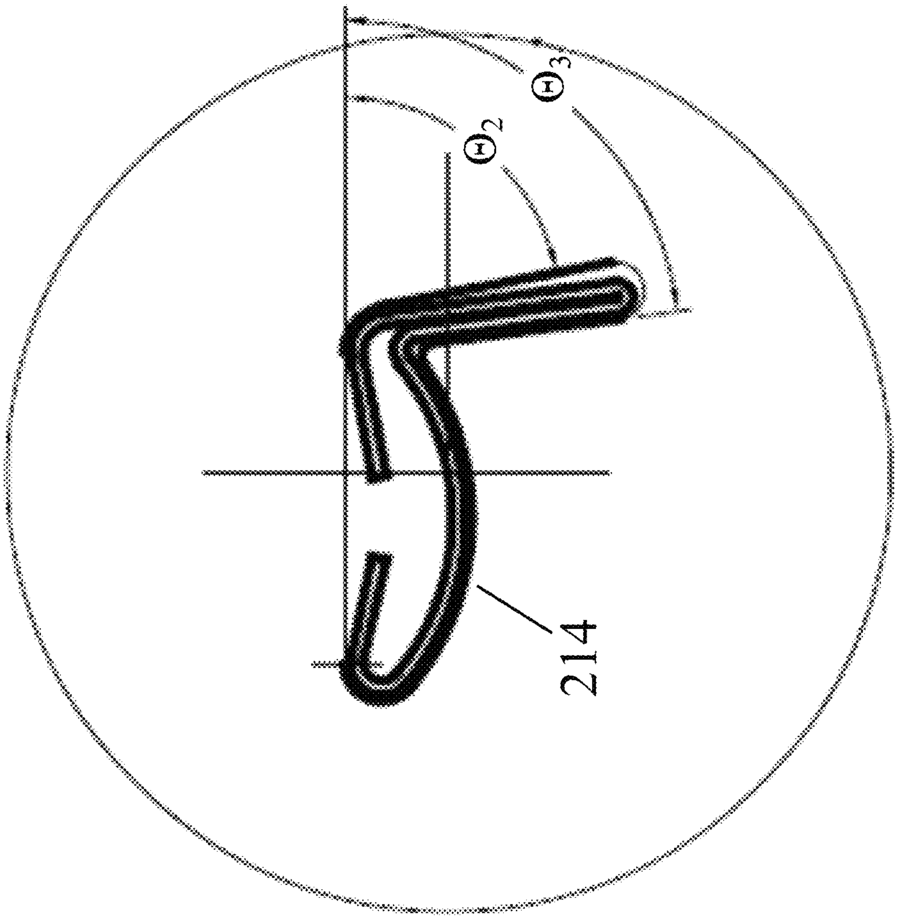

Cross-sectional views of the tools 101 through 114 are shown in FIGS. 9A through 9O, including the cross-sectional profiles 201 through 214 created at each step by the tools 101 through 114 formed through the process. In FIG. 9O, the cross-sectional profile 214 of the final form is shown, with the transition shown between flange angle ($\Theta_2$) in cross-sectional profile 213 of approximately 79° to a further angle ($\Theta_3$) in cross-sectional profile 214 of approximately 82.5°.

Figures 10A, 10B:
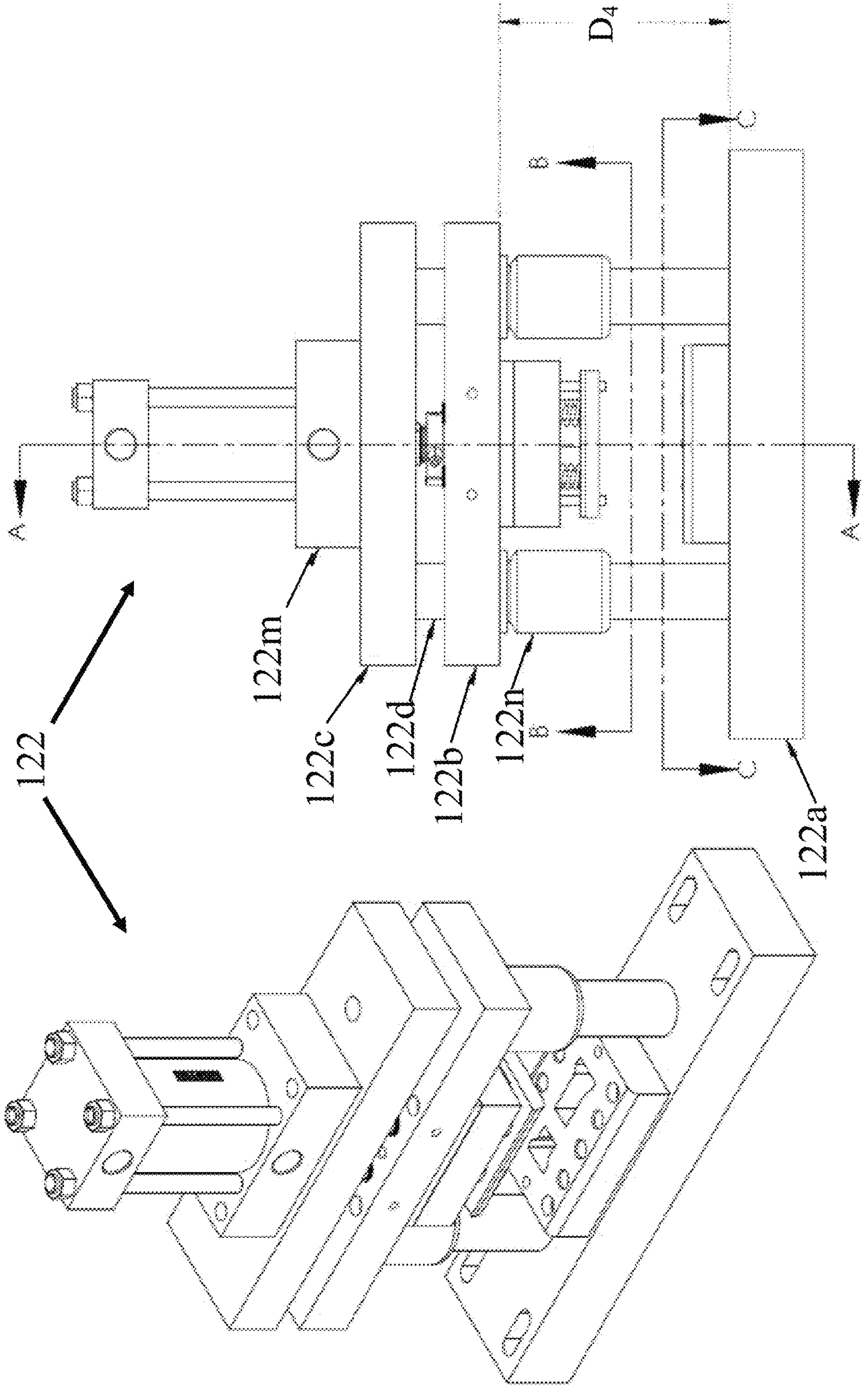
FIGS. 10A-10E show various views of a no-sight double straight die used in the process of creating the flanged interlocking molding in accordance with an embodiment of the present application.
Figure 10D:
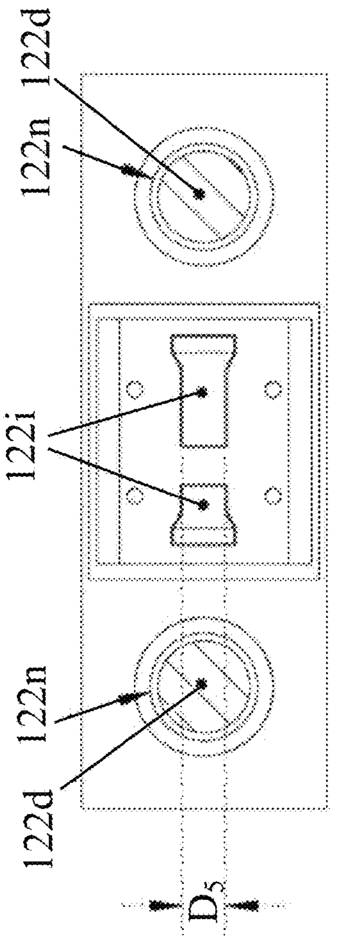
Figure 10E:
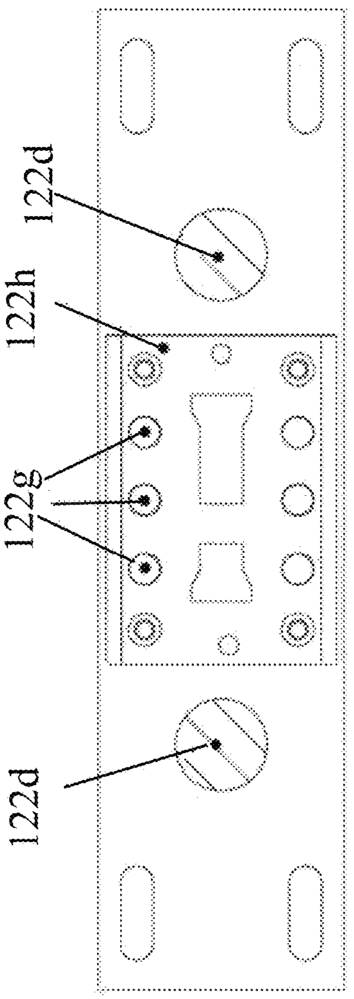
Figure 10C:
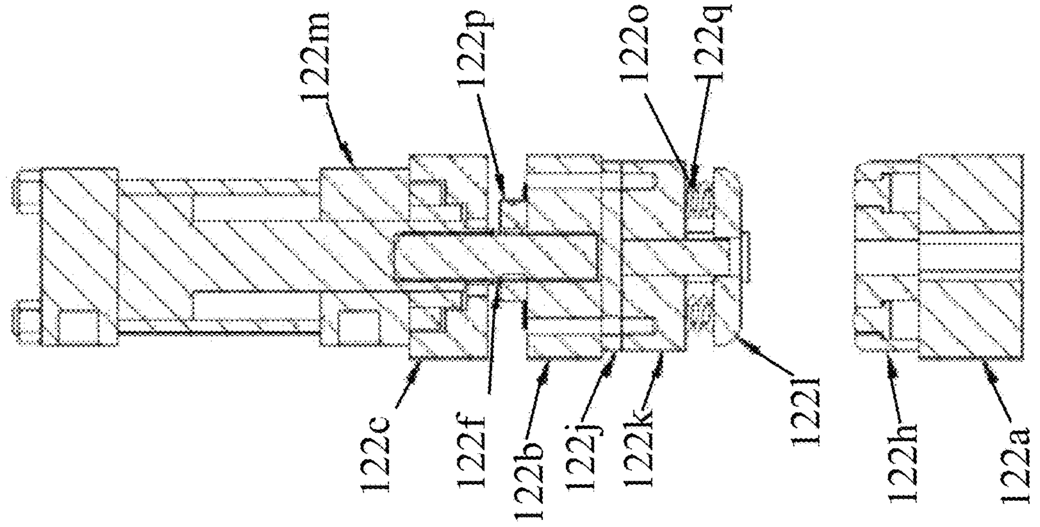
Figures 11A, 11B:
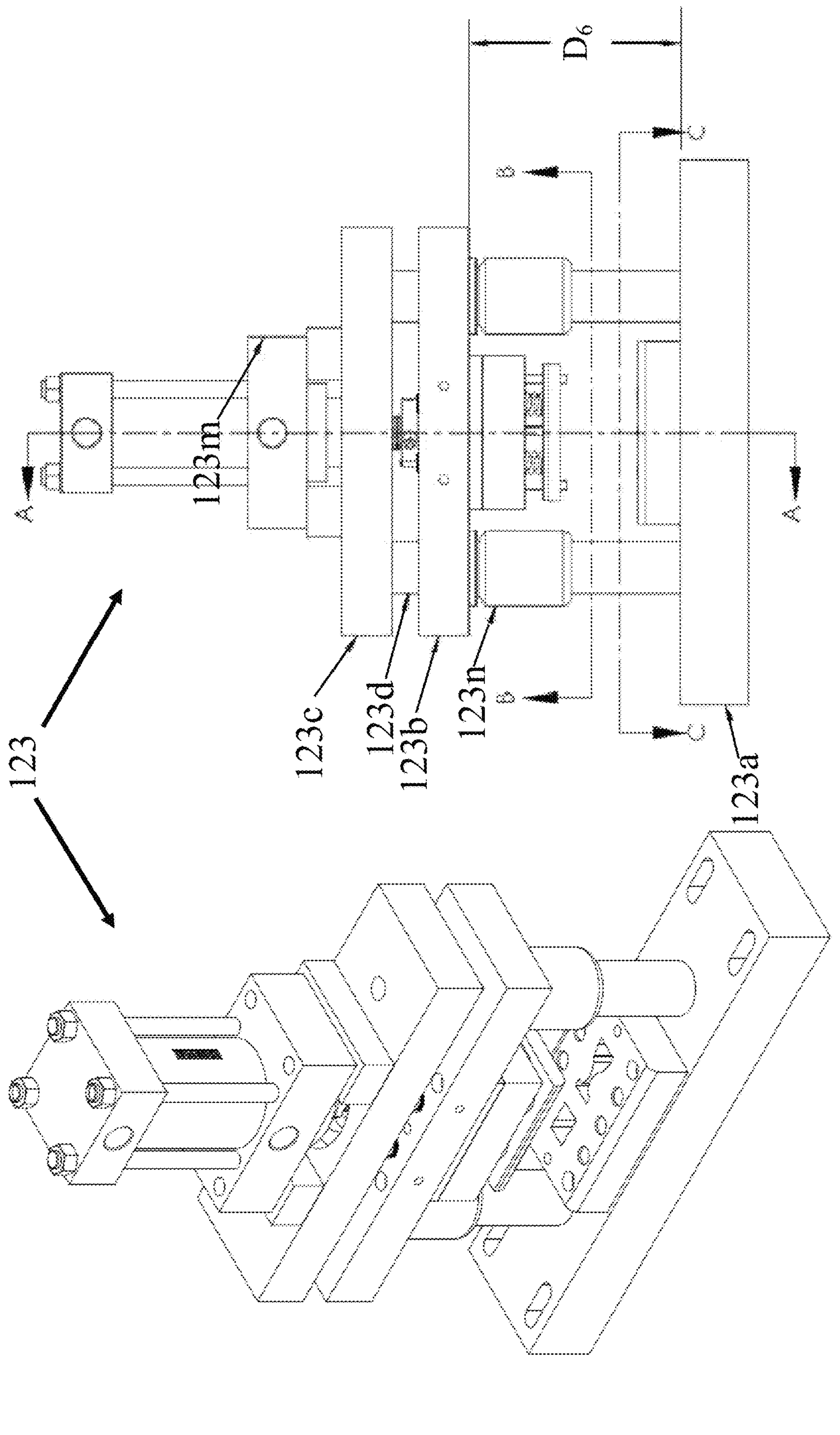
FIGS. 11A-11E show various views of a no-sight double miter die used in the process of creating the flanged interlocking molding in accordance with an embodiment of the present application.
Figures 11C, 11D, 11E:
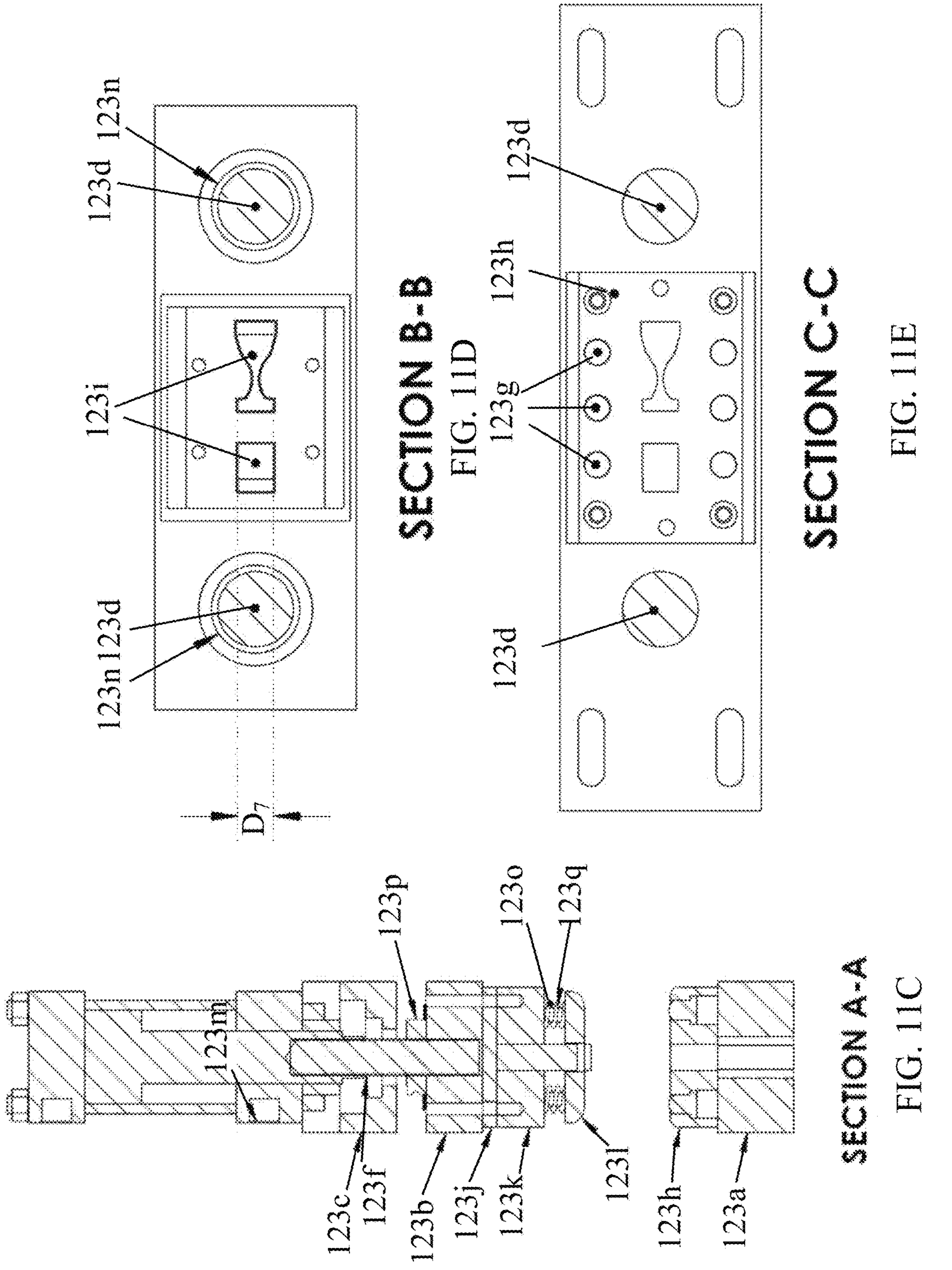
Figures 12A, 12B, 12C, 12D:
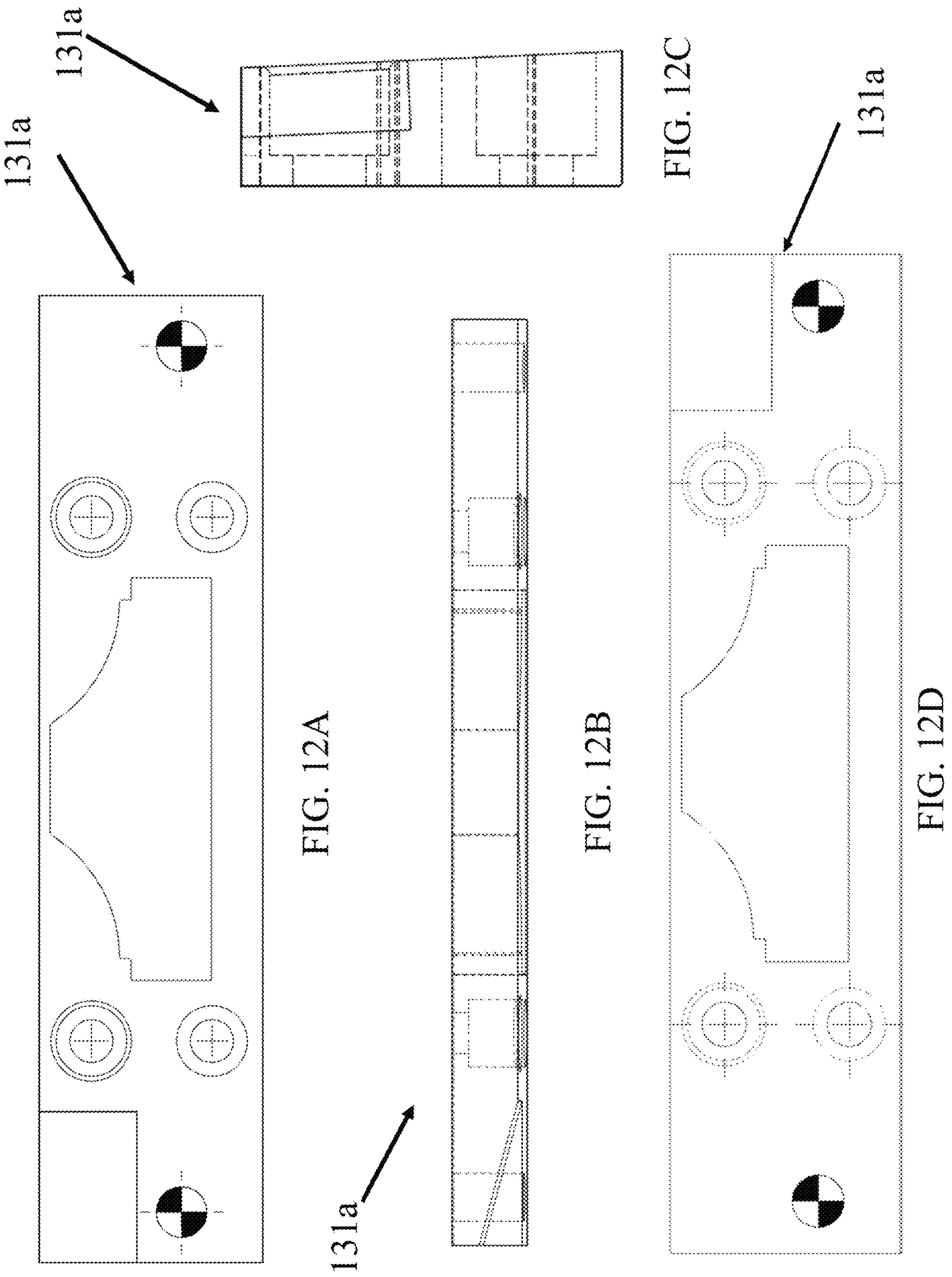
FIGS. 12A-12D show various views of a jog die of a no-sight double miter die used in the process of creating the flanged interlocking molding in accordance with an embodiment of the present application.
Figure 13A:
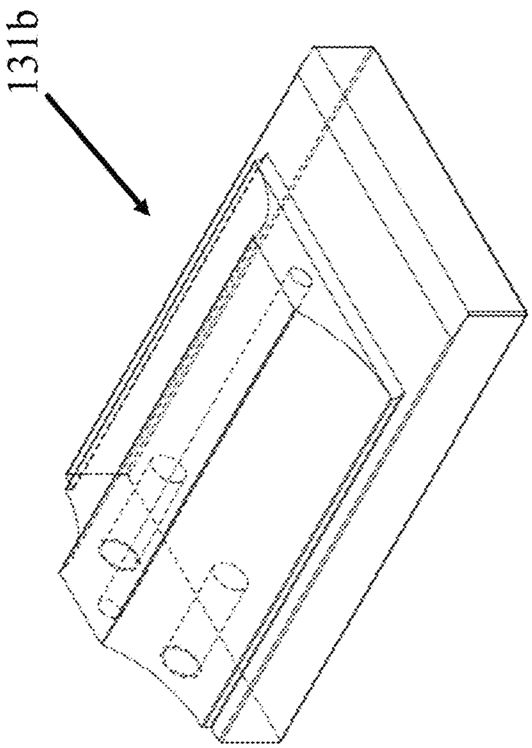
FIGS. 13A-13D show various views of a punch of a no-sight double miter die used in the process of creating the flanged interlocking molding in accordance with an embodiment of the present application.
Figure 13B:
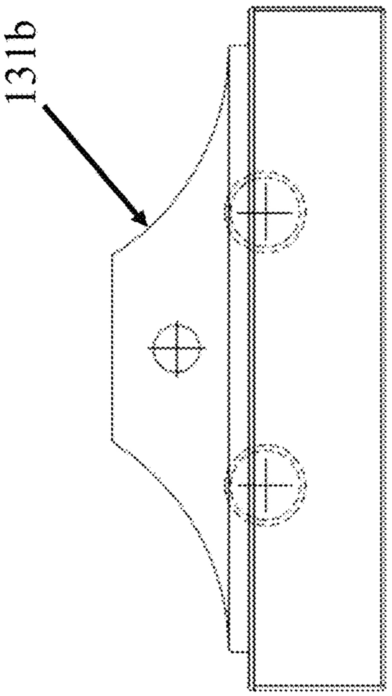
Figure 13C:
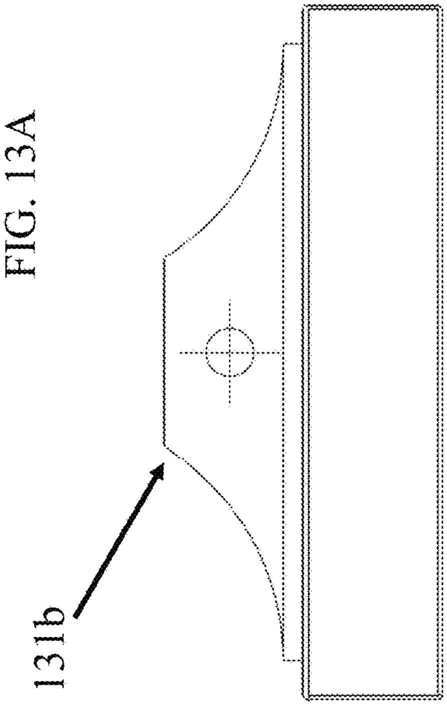
Figure 13D:
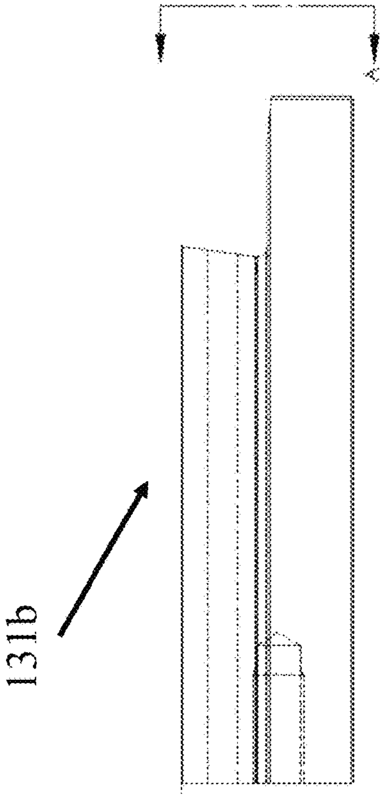

FIGS. 10A-10E show a no-sight double straight die 122 used in the roll forming assembly apparatus 100. The no-sight double straight die 122 comprises: base shoe 122*a*, punch shoe 122*b*, top shoe 122*c*, die pin 122*d*, up stop, rod extension 122*f*, lifter button 122*g*, die ring 122*h*, punch 122*i*, punch backup 122*j*, punch holder 122*k*, stripper 122*l*, head cylinder 122*m*, die bushing 122*n*, die spring 122*o*, collar 122*p*, and shoulder bolt 122*q*. In FIG. 10A, the up stops and shoulder bolt shims are not shown for clarity. In the no-sight double straight die 122 shown in FIGS. 10A-10E, the height ($D_4$) between the base shoe 122*a* and punch shoe 122*b* is 6.22 inches when open and 3.72 inches when shut, and the punch 122*i* includes a width ($D_5$) of 0.7050 inches FIGS. 11A-11E show a no-sight double miter die 123 used in the roll forming assembly apparatus 100. The no-sight double miter die 123 comprises: base shoe 123*a*, punch shoe 123*b*, top shoe 123*c*, die pin 123*d*, up stop, rod extension 123*f*, lifter button 123*g*, die ring 123*h*, punch 123*i*, punch backup 123*j*, punch holder 123*k*, stripper 123*l*, head cylinder 123*m*, die bushing 123*n*, die spring 123*o*, collar 123*p*, and shoulder bolt 123*q*. In FIG. 10A, the up stops and shoulder bolt shims are not shown for clarity. In the no-sight double miter die 123 shown in FIGS. 11A-11E, the height ($D_6$) between the base shoe 123*a* and punch shoe 123*b* is 6.22 inches when open and 3.72 inches when shut, and the punch 123*i* includes a width ($D_7$) of 0.7050 inches A first unique characteristic of the design of the flanged interlocking molding 80 is the two wings or arms 85*a*, 85*b*, which act as both alignment guides as well as the male portion of the interlocking design concept when assembling metal partitions. The arms 85*a*, 85*b* comprise adjacent edges, which must be parallel to each other and uniform in length and angular alignment in order to center the molding 81 to the two female portions of the interlocking design concept which is found on the two outer skins of the metal partition (see, e.g., FIG. 4K). The length of each arm 85*a*, 85*b* is formed by tooling 101 and 102. The angular alignment of the arms 85*a*, 85*b* is formed by tooling 103, 104, and 105 with the final alignment occurring in tooling 106 through 114. The arms 85*a*, 85*b* may comprise straight ends 86*a*, 86*b* terminating the arms 85*a*, 85*b* with a substantially right angle, or may comprise beveled ends 87*a*, 87*b*

A second unique characteristic the design of the flanged interlocking molding 80 is that the flange 82 is designed to reduce the line of sight that is commonly created when installing a toilet partition, as well as achieving the requirements of what is commonly known as the stop for a toilet partition. In order to reduce the line of sight, while at the same time ensuring the successful installation of the components, both the length of the flange 82 and its angular alignment to the interlocking molding 81 of the flanged interlocking molding 80 are critical. In order to withstand the force that is enacted on the stop when a partition door 60 is closed, the characteristics of the flange 82 at two locations are critical. The flange 82 of the flanged interlocking molding 80 begins at the point where the radius of the domed feature of the interlocking molding 81 is descending. Due to the physical properties of the material, an intersecting radius formed in the opposite direction of the existing radius is required. The formation of this feature begins with tool 102 and due to the physical properties of the material is formed across tools 103, 104, 105, 106, 107, 108 and is completed in tool 109. At the peak of the flange 82, the material must be redirected 180 degrees in order to finalize the second arm 85*b* of the interlocking molding 81. In order to overcome the physical properties of the material, a radius must be formed at the peak of the flange 82 that does not introduce stress that will deform the flanged interlocking molding 80. The formation of these features begins with tool 102 and due to the physical properties of the material is formed across tools 103, 104, 105, 106, 107, 108, 109, 110, 111, 112, 113, and is finalized with tool 114.

A third unique characteristic of the design of the flanged interlocking molding 80 is the transition of the flanged interlocking molding 80 when it is cut to length. When installed on the toilet partition 50, the flanged interlocking molding 80 aligns with two additional interlocking moldings on the lock side of the door 60 and with two hinges 61*a*, 61*b* on the hinge side of the door 60 to finalize the toilet partition 50. In order to cut the flanged interlocking molding 80 correctly to ensure alignment and minimalize additional processing, the strip is first punched by the double miter die (123) or the double straight die (122). An example of a flanged interlocking molding 80 formed with a processing step by the double straight die 122 are shown in FIGS. 6A-5B, and examples of a flanged interlocking molding 80 formed with a processing step by the double miter die 123 are shown in FIGS. 6B, 6C, and 6F. After the strip is formed, a custom cutoff tool is provided as shown in FIGS. 12A-13D to finalize the strip in accordance to its final length. The die 131 also ensures that a safety hazard (sharp edge) to the end user is not introduced by cutting a sharp edge from the flange 82 to form the curved flange ends 83*a*, 83*b*, as shown for example in FIGS. 6B-6C. For contrast, FIG. 6A shows flanged interlocking molding 80 lacking the curved flange ends 83*a*, 83*b*. The no-sight cutoff die 131 includes a jog die 131*a* and a correspondingly shaped punch 131*b*.

While there have been shown and described and pointed out fundamental novel features of the invention as applied to embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed:

1. An apparatus comprising:

a body portion;

a first arm opposing an inner surface of the body portion and extending from a first edge of the body portion;

a flange comprising parallel layers of the metallic material, the parallel layers comprising:

a first layer extending in a first direction away from the body portion at a second edge of the body portion opposite the first edge of the body portion, and a second layer extending at a first edge from the first layer in a second direction opposite the first direction; and a second arm extending from a second edge of the second layer of the flange and opposing the inner surface of the body portion, the second arm comprising an edge arranged parallel to an edge of the first arm with a gap formed therebetween, wherein the flange is formed at a non-perpendicular angle relative to a reference plane through a base of the first arm and a base of the second arm and is configured to serve as a stop for a door closure; and wherein the apparatus is formed of a single, elongated, and contiguous strip of a metallic material.

2. The apparatus according to claim 1, wherein the body portion comprises an outer surface having a convexly curved cross-sectional profile.

3. The apparatus according to claim 1, wherein the flange comprises a first end and a second end, and at least one of the first end or the second end is curved.

4. The apparatus according to claim 1, wherein the flange comprises a first end and a second end, and at least one of the first end or the second end is beveled.

5. The apparatus according to claim 1, wherein the flange comprises a first end and a second end, and at least one of the first end or the second end is straight and comprises a substantially right angle.

6. The apparatus according to claim 1, wherein the first arm comprises a first end and a second end, and at least one of the first end or the second end are beveled.

7. The apparatus according to claim 1, wherein the second arm comprises a first end and a second end, and at least one of the first end or the second end are beveled.

8. The apparatus according to claim 1, wherein the metallic material is stainless steel, aluminum, or galvanneal.

9. The apparatus according to claim 1, wherein the first arm and the second arm collectively form a locking mechanism configured to engage locking elements on a structure to secure the apparatus to the structure.

10. The apparatus according to claim 1, wherein the length of the body portion is greater than the length of each of the flange, the first arm, and the second arm.

11. The apparatus according to claim 1, wherein the apparatus has a uniform cross-sectional profile along the entire length of the apparatus.

12. A system, comprising:

a door having a hinge side and a locking side;

a first pilaster arranged adjacent to the hinge side of the door;

a second pilaster arranged adjacent to the locking side of the door; and a first apparatus secured to the hinge side of the door or the first pilaster, and a second apparatus secured to the locking side of the door or the second pilaster, each of the first and second apparatuses being formed of a single, elongated, and contiguous strip of a metallic material, and comprising:

a body portion;

a first arm opposing an inner surface of the body portion and extending from a first edge of the body portion;

a flange comprising parallel layers of the metallic material, the parallel layers comprising:

a first layer extending in a first direction away from the body portion at a second edge of the body portion opposite the first edge of the body portion, and a second layer extending at a first edge from the first layer in a second direction opposite the first direction; and a second arm extending from a second edge of the second layer of the flange and opposing the inner surface of the body portion, the second arm comprising an edge arranged parallel to an edge of the first arm with a gap formed therebetween, wherein the flange is formed at a non-perpendicular angle relative to a reference plane through a base of the first arm and a base of the second arm, and is configured to serve as a stop for a door closure; wherein the first apparatus is provided along the height of the hinge side of the door or the first pilaster and the flange of the first apparatus is configured to conceal a gap formed between the door and the first pilaster to prevent a sightline forming between the first pilaster and the door; and wherein the second apparatus is provided along the height of the locking side of the door or the second pilaster and the flange of the second apparatus is configured to conceal a gap formed between the door and the second pilaster to prevent a sightline forming between the second pilaster and the door.

13. The system according to claim 12, wherein the first apparatus is secured to the first pilaster and the second apparatus is secured to the second pilaster.

14. The system according to claim 13, wherein the first pilaster comprises a pair of lengthwise slots configured to be engaged by the first arm and the second arm of the first apparatus to secure the first apparatus to the first pilaster.

15. The system according to claim 14, wherein the first pilaster comprises:

an inner core;

a first skin covering a first side of the inner core; and a second skin covering a second and opposite side of the inner core;

wherein each of the first skin and the second skin comprise a lengthwise hook element, each defining one of the lengthwise slots therein; and wherein the first apparatus is configured to clamp the first skin to the second skin of the first pilaster.

16. The system according to claim 12, wherein the first apparatus is secured to the hinge side of the door and the second apparatus is secured to the locking side of the door.

17. The system according to claim 16, wherein the hinge side of the door and the locking side of the door each comprise a pair of lengthwise slots configured to be respectively engaged by the first arm and the second arm of the first apparatus to secure the first apparatus to the hinge side of the door and by the first arm and the second arm of the second apparatus to secure the second apparatus to the locking side of the door.

18. The system according to claim 17, wherein the door comprises:

an inner core;

a first skin covering a first side of the inner core; and a second skin covering a second and opposite side of the inner core;

wherein each of the first skin and the second skin comprise a lengthwise hook element on each of the hinge side of the door and the locking side of the door, each defining one of the pair of lengthwise slots therein; and wherein the first apparatus and the second apparatus are configured to clamp the first skin to the second skin of the door.

19. The system according to claim 12, wherein the door is configured for rotation of at least ninety degrees about the hinge side from a first, closed position to a second, opened position.

20. A system comprising:

an apparatus, formed of a single, elongated, and contiguous strip of a metallic material, comprising:

a body portion;

a first arm opposing an inner surface of the body portion and extending from a first edge of the body portion;

a flange comprising parallel layers of the metallic material, the parallel layers comprising:

a first layer extending in a first direction away from the body portion at a second edge of the body portion opposite the first edge of the body portion, and a second layer extending at a first edge from the first layer in a second direction opposite the first direction; and a second arm extending from a second edge of the second layer of the flange and opposing the inner surface of the body portion, the second arm comprising an edge arranged parallel to an edge of the first arm with a gap formed therebetween, wherein the flange is formed at a non-perpendicular angle relative to a reference plane through a base of the first arm and a base of the second arm, and is configured to serve as a door stop; and a panel structure to which the apparatus is secured.

21. The system according to claim 20, wherein the panel structure is a door, and the apparatus is secured to the door on one vertical edge of the door along the height of the door.

22. The system according to claim 20, wherein the panel structure is a pilaster, and the apparatus is secured to the pilaster on one vertical edge of the pilaster along the height of the pilaster.

* * * * *